US009120959B2

(12) United States Patent
Hara et al.

(10) Patent No.: US 9,120,959 B2
(45) Date of Patent: Sep. 1, 2015

(54) CHEMICAL THERMAL ENERGY STORAGE MATERIAL STRUCTURE, METHOD OF PRODUCING THE SAME, AND CHEMICAL HEAT ACCUMULATOR

(75) Inventors: Masashi Hara, Nagoya (JP); Miyo Mochizuki, Seto (JP); Takashi Shimazu, Nagoya (JP); Hideo Sobukawa, Nisshin (JP); Yoshiaki Fukushima, Aichi (JP); Tomohisa Wakasugi, Toyota (JP); Kazuhisa Yano, Nisshin (JP); Hiroyuki Itahara, Maibara (JP); Tsutomu Sawada, Maibara (JP); Takatsune Fujimura, Maibara (JP)

(73) Assignees: KABUSHIKI KAISHA TOYOTA CHUO KENKYUSHO, Aichi (JP); OMI MINING CO., LTD., Maibara-shi (JP)

( * ) Notice: Subject to any disclaimer, the term of this patent is extended or adjusted under 35 U.S.C. 154(b) by 206 days.

(21) Appl. No.: 13/636,949

(22) PCT Filed: Mar. 24, 2011

(86) PCT No.: PCT/JP2011/057248
§ 371 (c)(1),
(2), (4) Date: Nov. 28, 2012

(87) PCT Pub. No.: WO2011/118736
PCT Pub. Date: Sep. 29, 2011

(65) Prior Publication Data
US 2013/0075052 A1    Mar. 28, 2013

(30) Foreign Application Priority Data
Mar. 25, 2010    (JP) .................................. 2010-069986

(51) Int. Cl.
*C04B 16/02*    (2006.01)
*C09K 5/14*    (2006.01)
(Continued)

(52) U.S. Cl.
CPC . *C09K 5/14* (2013.01); *C09K 5/063* (2013.01); *C09K 5/16* (2013.01); *F28D 17/00* (2013.01); *F28D 20/003* (2013.01); *Y02E 60/142* (2013.01)

(58) Field of Classification Search
CPC ........ C04B 33/13; C04B 33/04; C04B 35/18; C04B 28/02; C04B 24/383; C09K 3/185; C09K 3/18
USPC .............................. 501/141; 252/70; 106/805
See application file for complete search history.

(56) References Cited

U.S. PATENT DOCUMENTS 3,986,969 A * 10/1976 Telkes .............................. 252/70
4,277,357 A *  7/1981 Boardman ...................... 252/70
(Continued)

FOREIGN PATENT DOCUMENTS

JP    A-62-120215    6/1987
JP    A-62-213689    9/1987
(Continued)

OTHER PUBLICATIONS

Mar. 3, 2009 International Search Report issued in International Patent Application No. PCT/JP2008/071553 (with translation).
(Continued)

*Primary Examiner* — Noah Wiese
(74) *Attorney, Agent, or Firm* — Oliff PLC

(57) ABSTRACT

Disclosed is a chemical thermal energy storage material structure, including a granular chemical thermal energy storage material, a clay mineral having a layered ribbon structure, and a complex metal silicate that is generated by a reaction between the above-mentioned chemical thermal energy storage material and the above-mentioned clay mineral and that includes at least one type of alkaline earth metal.

23 Claims, 6 Drawing Sheets

(51) Int. Cl.
*C09K 5/16* (2006.01)
*F28D 20/00* (2006.01)
*C09K 5/06* (2006.01)
*F28D 17/00* (2006.01)

(56) References Cited

U.S. PATENT DOCUMENTS

| | | | | |
|---|---|---|---|---|
| 4,318,732 A | * | 3/1982 | Sawyer, Jr. | 71/64.08 |
| 4,747,240 A | * | 5/1988 | Voisinet et al. | 52/173.1 |
| 5,687,706 A | * | 11/1997 | Goswami et al. | 126/263.01 |
| 8,045,846 B2 | * | 10/2011 | Amano | 392/346 |
| 2011/0108241 A1 | * | 5/2011 | Driscoll et al. | 165/104.21 |

FOREIGN PATENT DOCUMENTS

| | | |
|---|---|---|
| JP | A-1-225686 | 9/1989 |
| JP | A-5-71887 | 3/1993 |
| JP | A-5-223478 | 8/1993 |
| JP | U-6-55066 | 7/1994 |
| JP | B2-6-80394 | 10/1994 |
| JP | B2-6-80395 | 10/1994 |
| JP | A-7-332788 | 12/1995 |
| JP | A-2004-3832 | 1/2004 |
| JP | A-2004-269560 | 9/2004 |
| JP | A-2005-134101 | 5/2005 |
| JP | A-2009-132844 | 6/2009 |
| JP | A-2009-133588 | 6/2009 |
| JP | A-2009-149837 | 7/2009 |
| JP | A-2009-149838 | 7/2009 |
| JP | A-2009-221289 | 10/2009 |
| JP | A-2009-227773 | 10/2009 |
| JP | 2009-256520 A * | 11/2009 ............... C09K 5/08 |
| JP | A-2009-256520 | 11/2009 |
| WO | WO 2009/069701 A1 | 6/2009 |

OTHER PUBLICATIONS

Mar. 3, 2009 Written Opinion of the International Searching Authority in International Patent Application No. PCT/JP2008/071553.
Apr. 19, 2011 International Search Report cited in International Patent Application No. PCT/JP2011/057248 (with translation).
May 17, 2010 U.S. Appl. No. 12/743,272, Takashi Shimazu et al.

* cited by examiner (a) x 20000    2 μm (b) x 40000    1 μm

CHEMICAL THERMAL ENERGY STORAGE MATERIAL STRUCTURE, METHOD OF PRODUCING THE SAME, AND CHEMICAL HEAT ACCUMULATOR

TECHNICAL FIELD

The present invention relates to a chemical thermal energy storage material structure in which a chemical thermal energy storage material performing endotherm and exotherm is molded and calcinated and a method for producing the chemical thermal energy storage material structure, and a chemical heat accumulator.

BACKGROUND ART

A chemical thermal energy storage material which is a material capable of performing endotherm and heat release by utilizing a chemical reaction is conventionally widely known, and the uses thereof in a variety of applications have been considered.

For example, disclosed is a chemical thermal energy storage material molding in which a powdery hydration reactive chemical thermal energy storage material and sepiolite which is a clay mineral are kneaded and molded, and in which a flow path for supplying a reactant therein or for discharging a reaction product is formed (see, for example, Patent Document 1). This document describes that the reactivity for heat storage or heat release and the heat transfer property can be combined.

PRIOR ART DOCUMENT

Patent Document

[Patent Document 1] Japanese Patent Application Laid-Open (JP-A) No. 2009-149838

DISCLOSURE OF THE INVENTION

Problem to be Solved by the Invention

However, the above-mentioned conventional chemical thermal energy storage material molding is obtained by calcination at a temperature of 350 to 500° C. For this reason, even though the reactivity improvement due to increase of the specific surface area is expected, a reaction between the chemical thermal energy storage material and the clay mineral or sintering of the clay mineral does not occur in such a temperature range. Accordingly, there is a problem in that the manufactured structure has an insufficient structural strength. For this reason, when endoergic reaction or exothermic reaction of the chemical thermal energy storage material during the use of the structure occurs, the molding is influenced by a volume change generated by endotherm and exotherm thereof, which generates crack or deformation on the structure.

The present invention was made in view of the above circumstances, and it is required to provide a chemical thermal energy storage material structure having a higher strength than conventional structures and in which generation of damage (crack or the like) or deformation is inhibited and a method for producing the same, and a chemical heat accumulator having an excellent heat utilization characteristics.

Means for Solving the Problems

The present invention is attained based on the following findings.

One finding is that, when a structure is manufactured by using a powder material of a chemical thermal energy storage material such as hydroxides of Ca, Mg or the like, it is effective for tremendously increasing the moldability or the strength of the structure not only to use clay mineral but further to have a reaction product of the chemical thermal energy storage material and the clay mineral in the presence of the chemical thermal energy storage material and the clay mineral. Another finding is that, it is effective for tremendously increasing the strength of the structure to perform calcination in a temperature range in which the reaction between the chemical thermal energy storage material and the clay mineral proceeds and sintering does not occur, and further to have a calcination condition in which carbonation of a metal can be suppressed.

In order to attain the above-mentioned object, the chemical thermal energy storage material structure of the first invention is <1> a chemical thermal energy storage material structure including: a granular chemical thermal energy storage material; a clay mineral having a layered ribbon structure; and a complex metal silicate which is a reaction product of the chemical thermal energy storage material and the clay mineral, and contains at least one alkaline earth metal.

In the first invention, the chemical thermal energy storage material structure has a constitution further having a complex metal silicate which is a reaction product of a chemical thermal energy storage material and a clay mineral in the presence of the chemical thermal energy storage material and the clay mineral, and has a mesh structure in which many pores are formed, whereby the chemical thermal energy storage material structure is structured to be able to elastically deformed. Therefore, the chemical thermal energy storage material structure has a higher structural strength than the conventional structure which does not contain a complex metal silicate, and generation of damage (crack or the like) or deformation when a volume change occurs due to endotherm and exotherm may be inhibited.

Next, preferred embodiment of the chemical thermal energy storage material structure of the first invention will be described in the following.

<2> In the chemical thermal energy storage material structure as described in <1>, it is preferable that the chemical thermal energy storage material have a secondary particle size of 50 μm or less.

When the chemical thermal energy storage material has a composition such that the material exists with a secondary particle size of 50 μm or less, the reaction between a chemical thermal energy storage material and a clay mineral actively proceeds. Accordingly, there exists much reaction product generated between the chemical thermal energy storage material and the clay mineral, thereby increasing the structural strength of the structure.

<3> In the chemical thermal energy storage material structure as described in <1> or <2>, it is preferable that the structure have a porous structure, and the chemical thermal energy storage material be dispersed and held in the clay mineral by the complex metal silicate.

Since the structure has a mesh structure having a porous and chemical thermal energy storage material is dispersed in the clay mineral which forms the structure, the structure easily performs heat absorption and heat release and has an excellent diffusibility of water vapor. Here, the chemical thermal energy storage material exists by the complex metal silicate generated between the chemical thermal energy storage material and the clay mineral.

<4> In the chemical thermal energy storage material structure as described in any one of the above <1> to <3>, the carbon concentration in the structure is preferably 1% by mass or less of the total mass.

When the carbon concentration is as low as 1% by mass or less, since the amount of carbonate present in the molding is small, the structure has an excellent structural strength.

<5> In the chemical thermal energy storage material structure as described in any one of the above <1> to <4>, the content ratio of the complex metal silicate is preferably in the range of 2 to 80% by mass of the total mass.

Since, by containing a prescribed percentage of complex metal silicate, the mesh porous structure can exhibit an elastic deformation behavior, a volume change by endoergic reaction and exothermic reaction can be further moderated, thereby avoiding the generation of damage or deformation.

<6> In the chemical thermal energy storage material structure as described in any one of the above <1> to <5>, the content ratio of the chemical thermal energy storage material is preferably 20 to 98% by mass of the total mass of the structure.

By containing a prescribed percentage of the chemical thermal energy storage material, the amount of endotherm and exotherm can be kept high and the structure has an excellent structural strength.

<7> In a preferred aspect of the chemical thermal energy storage material structure as described in any one of the above <1> to <6>, the clay mineral contains at least one selected from the group consisting of sepiolite, palygorskite and kaolinite.

<8> In the chemical thermal energy storage material structure as described in any one of the above <1> to <7>, the chemical thermal energy storage material can contain, as the chemical thermal energy storage material, a hydration reactive thermal energy storage material which absorbs heat by a dehydration reaction and release heat by a hydration reaction.

When the chemical thermal energy storage material structure is constructed by such a hydration reactive thermal energy storage material, damages such as cracks or malfunctions due to deformations which tend to occur during endotherm and exotherm can be effectively prevented.

The production method of a chemical thermal energy storage material structure which is the second invention is <9> A method of producing a chemical thermal energy storage material structure is constructed by including: mixing at least a powdered chemical thermal energy storage material and a clay mineral having a layered ribbon structure to prepare a mixture in which a secondary particle size of the chemical thermal energy storage material is 50 µm or less; molding the mixture to form a molded body; and calcinating the molded body in an atmosphere containing oxygen in a temperature range of from 700° C. to lower than 800° C.

In the second invention, by calcinating a mixture containing a chemical thermal energy storage material having an average primary particle size of 50 µm or less as a minor diameter under oxygen at a prescribed temperature range, a reaction between a chemical thermal energy storage material and a clay mineral can be actively performed and sintering (aggregation) can also be inhibited. Therefore, generation of a complex metal silicate which is a reaction product of the chemical thermal energy storage material and the clay mineral can be kept high and the structural strength of the structure after the calcination can be increased.

In the following, a preferred embodiment of the method of producing a chemical thermal energy storage material structure which is the second invention will be described.

<10> In the method of producing a chemical thermal energy storage material structure as described in the above <9>, the calcinating includes calcinating by heating at a rate of temperature increase of 40° C./min or higher.

When the rate of temperature increase during the calcination is 40° C./min or higher, a reaction (carbonation) of $CO_2$ generated by cumbusting organic substances derived from a binder or a clay mineral with the chemical thermal energy storage material can be inhibited. By this, the generation of carbonates such as $CaCO_3$ can be inhibited, thereby increasing the strength of the structure.

<11> In the method of producing a chemical thermal energy storage material structure as described in the above <9> or <10>, the calcinating includes cooling the calcinated molded body at a rate of temperature decrease of 20° C./min. or higher.

By providing the cooling after the calcinating and setting the rate of temperature decrease during cooling 20° C./min or higher, the generation of carbonate such as $CaCO_3$ or the like by the reaction with $CO_2$ in the atmosphere can be controlled, thereby increasing the strength of the obtained structure.

<12> In the method of producing a chemical thermal energy storage material structure as described in the above <11>, the calcinating is preferably performed in the following aspect. That is, a) the rate of temperature increase during calcinating is 150° C./min or higher and/or, b) the calcinating has a cooling the molding (structure) after the calcination, and the rate of temperature decrease during cooling in getting cool is 150° C./min or higher.

It is preferred that the rate of the temperature increase and/or the temperature decrease in the calcinating is higher rate, since the carbonation of the chemical thermal energy storage material can be prevented. In the present invention, the rate is preferably 150° C./min. or higher from the viewpoint of increasing the strength of the structure.

<13> In the method of producing a chemical thermal energy storage material structure as described in any one of the above <8> to <12>, the mixing includes preparing the mixture by mixing a thermal energy storage material suspension in which the chemical thermal energy storage material is dispersed and suspended in a medium and a clay mineral suspension in which the clay mineral is dispersed and suspended in a medium, drying, and powdering.

When mixing a powdery chemical thermal energy storage material and a clay mineral, by mixing the powdery chemical thermal energy storage material and the clay mineral after forming a state that both sides are respectively suspended, a mixed powder with a finer diameter, specifically a mixed powder with at least the secondary particle size of the chemical thermal energy storage material of 50 µm or less can be easily prepared.

<14> In the method of producing a chemical thermal energy storage material structure as described in any one of the above <8> to <13>, the content ratio of the clay mineral in the clay mineral suspension is preferably in a range of 1 to 10% by mass of the total mass of the suspension.

When a suspension contains a clay mineral is prepared, since dispersion and suspension are performed in the vicinity of the thickening limit, mesh formation of the clay mineral exhibiting a microfibrous shape is accelerated. By this, an elastic deformability can be provided to the porous structure.

For this reason, when a volume change due to endotherm and exotherm occurs, the resultant damage or large deformation of the structure can be dissolved.

<15> In the method of producing a chemical thermal energy storage material structure as described in the above <13> or <14>, the method can further include preparing the clay mineral suspension by leaving a dispersion liquid, which is obtained by dispersing the clay mineral in a medium, to stand still (aging).

By including an aging, since a fiber can be unravelled without cutting the fiber, a mesh structural strength of the the clay mineral is more increased.

<16> In the method of producing a chemical thermal energy storage material structure as described in any one of the above <9> to <15>, the calcinating includes performing calcination for 15 to 45 minutes.

Further, the chemical heat accumulator of the third invention is

<17> a chemical heat accumulator being constructed by including: the chemical thermal energy storage material structure as described in any one of the above <1> to <8>; and a gas flow path provided such that a reactant gas circulates and the circulating reactant gas is in contact with the chemical thermal energy storage material structure.

In the third invention, as mentioned above, by including the chemical thermal energy storage material structure of the present invention which is constructed by further including a complex metal silicate which is a reaction product of a chemical thermal energy storage material and a clay mineral under the presence of the chemical thermal energy storage material and the clay mineral, the structure has a higher structural strength than the conventional heat accumulator which does not contain a complex metal silicate, and the generation of damages (cracks or the like), deformation when a volume change of endotherm and exotherm occurs is inhibited.

In the following, a preferred embodiment of the chemical heat accumulator of the third invention is described.

<18> The chemical heat accumulator as described in the above <17>, further including a reaction chamber which includes a supply and exhaust opening for supplying the reactant gas and discharging a reaction product gas, wherein the reaction chamber includes: the chemical thermal energy storage material structure; and a gas flow path retaining structure which is provided on at least one side of the chemical thermal energy storage material structure, and which retains the shape of the chemical thermal energy storage material structure and secures the gas flow path.

For example, by providing a gas flow path retaining structure on one side or both sides of a chemical thermal energy storage material structure which is molded in a plate shape, the shape of the chemical thermal energy storage material structure is retained, and even if the chemical thermal energy storage material structure cracks or collapses or the like while expansion or shrinkage thereof is repeated, a gas flow path can be secured. By this, endotherm and exotherm can be repeated for a long period of time and storage and usage (release) of heat can be performed more stably.

<19> The chemical heat accumulator as described in the above <18>, wherein the gas flow path retaining structure has a compressive strength which is larger than the expansion force of the chemical thermal energy storage material structure is preferred.

Since the compressive strength of a gas flow path retaining structure is larger than the expansion force of the chemical thermal energy storage material structure, even when the chemical thermal energy storage material structure expands, a deformation of the structure accompanied by the compression can be prevented.

<20> The chemical heat accumulator as described in the above <18> or <19>, wherein the gas flow path retaining structure contains a pore through which the reactant gas can pass, and has a filtration accuracy which is finer than the mean particle size of the particle in the chemical thermal energy storage material structure is preferred.

Since the filtration accuracy of the gas flow path retaining structure is smaller than the mean particle size of the particle in the structure specifically granular or finely powdered particles when the chemical thermal energy storage material structure collapses or the like, even when the structure cracks or collapses, the flow path is not blocked and a gas flow path can be secured. By this, endotherm and exotherm can be repeated for a long period of time, and storage and usage (release) of heat can be performed more stably.

<21> In the chemical heat accumulator as described in any one of the above <18 22 to <20>, the pressure loss in the gas flow path retaining structure is preferably 10 kPa or less.

Since the pressure loss of the gas flow path retaining structure is 10 kPa or less, the reaction between the reactant gas and the chemical thermal energy storage material (for example, when water vapor as a reactant gas circulates, the hydration reaction between the water vapor and the chemical thermal energy storage material) can be prevented to be inhibited.

The pressure loss herein refers to a pressure difference between gas outlet/inlet of a reactant gas in a steady state of a gas flow path retaining structure in which a reactant gas flows.

<22> In the chemical heat accumulator as described in any one of the above <18> to <21>, the heat capacity of the gas flow path retaining structure is preferably 10% or less of the heat capacity of the whole reaction chamber.

By inhibiting the heat capacity of the gas flow path retaining structure in the whole reactor 10% or less, the exotherm properties during the reaction can be retained without deteriorating.

<23> The chemical heat accumulator as described in any one of the above <17> to <22>, further including a heat exchanger which exchanges heat with the chemical thermal energy storage material structure is preferred.

By adjacently placing the heat exchanger which exchanges heat with the chemical thermal energy storage material structure, the apparatus can be miniatuarized and the reaction efficiency or the reaction speed between a reactant gas and a chemical thermal energy storage material can be increased.

Effects of the Invention

By the present invention, a chemical thermal energy storage material structure having a higher strength than conventional structures and in which generation of damage (crack or the like) or deformation is inhibited and a method of producing the same, and a chemical heat accumulator having an excellent heat utilization characteristics can be provided.

BEST MODES FOR CARRYING OUT THE INVENTION

In the following, a chemical thermal energy storage material structure of the present invention and a method of producing the same, and a chemical heat accumulator are described in detail.

<Chemical Thermal Energy Storage Material Structure>

The chemical thermal energy storage material structure of the present invention at least includes a granular chemical thermal energy storage material; a clay mineral having a layered ribbon structure; and a complex metal silicate which is a reaction product of the chemical thermal energy storage material and the clay mineral, and contains at least one alkaline earth metal. The chemical thermal energy storage material structure of the present invention can be composed of by further employing other components such as additives, as required.

In the present invention, a molding of a chemical thermal energy storage material performing endotherm and exotherm is generally fragile. For this reason, a clay mineral is added thereto and, a composition in which a complex metal silicate generated by the reaction between them is contained is configured. By employing this configuration, granular chemical thermal energy storage material can be easily fixed compared with the conventional material, and the structural strength of the structure can be tremendously improved. Concretely, the estimation is performed as follows.

That is, the complex metal silicate generated by reaction has a fibrous shape microscopically succeeding the shape of a clay mineral. These are entangled and configure a mesh shape to form a porous structure exhibiting an elastic deformability. By this, even when a particle made of chemical thermal energy storage material scattering therein expands or shrinks accompanied by endoergic reaction and exothermic reaction, the mesh elastically deforms to absorb a volume change to reduce a volume change and shape deformation of the whole structure. Accordingly, the generation of damages such as cracks or deformation of the structure can be inhibited.

Figure 13:
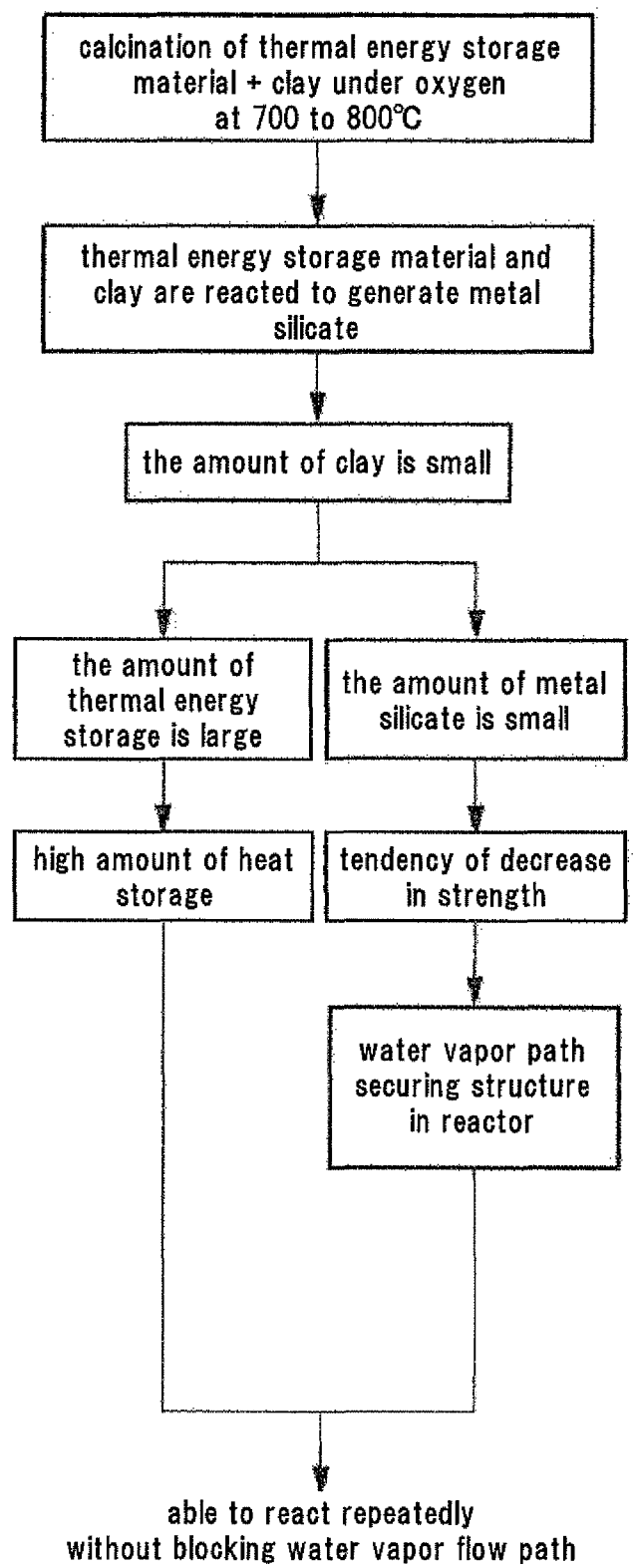
FIG. 13 is an explanatory diagram which explains the constitution and the effects of the present invention.

Conventionally, a chemical thermal energy storage material and a clay mineral have been mixed to be calcinated in a temperature range of 350 to 500° C. Under such a calcination temperature range, since the strength is insufficient, for example, in a repeated hydration reaction, a collapse is likely to occur due to expansion or shrink thereof. As a result, there has been a tendency that the gas flow path in a reactor (for example, a flow path in which water vapor circulates) is blocked to stop the reaction. On the other hand, in the present invention, as shown in FIG. 13, by mixing a chemical thermal energy storage material and a clay mineral to be calcinated under an oxygen containing atmosphere at a high temperature range of 700 to 800° C., and by making the chemical thermal energy storage material and the clay mineral to be reacted to generate a metal silicate, the generation of damages such as cracks or deformation can be more inhibited than before. In this case, in the system in which the amount of clay mineral is relatively small, although the heat storage amount is favorable since the amount of the chemical thermal energy storage material is relatively large, the strength may be decreased because the amount of generated metal silicate is small. In this case, as shown in the below-mentioned embodiment, by providing, in a reactor, a gas flow path retaining structure which retains the shape of the chemical thermal energy storage material as well as keeps a gas flow path 42 not to be blocked by a granular or powdery thermal energy storage material when these particles are generated, a repetitive use in a long period of time becomes possible.

—Chemical Thermal Energy Storage Material—

The chemical thermal energy storage material structure of the present invention contains at least one of granular chemical thermal energy storage material. The chemical thermal energy storage material is a material by which endotherm and exotherm can be performed by utilizing a chemical reaction, and the chemical thermal energy storage material exists as a powder in the structure. When the chemical thermal energy storage material is powdery, it refers to a state of a powder including particle state.

Examples of the chemical thermal energy storage material include inorganic hydroxides of alkaline earth metal such as calcium hydroxide ($Ca(OH)_2$), magnesium hydroxide ($Mg(OH)_2$), barium hydroxide ($Ba(OH)_2$) and hydrate thereof ($Ba(OH)_2.H2O$); inorganic hydroxides of alkaline metal such as lithium hydroxide monohydrate ($LiOH.H_2O$); and inorganic oxides such as aluminum oxide trihydrate ($Al_2O_3.3H_2O$). Among these, a hydration reactive thermal energy storage material which absorbs heat accompanied by a dehydration reaction and releases heat accompanied by a hydration reaction is preferred, and calcium hydroxide ($Ca(OH)_2$) is particularly preferred.

As the chemical thermal energy storage material, a commercially available product may be used. As the commercially available product, Ibuki Lime NEO-1 ($Ca(OH)_2$) manufactured by OMI-MINING CO., LTD. or the like can be used.

The average particle size of granular chemical thermal energy storage material is preferably 50 μm or less in the secondary particle size. When the average particle size of the chemical thermal energy storage material found inside the structure is 50 μm or less, the chemical thermal energy storage material readily reacts with a clay mineral and a reaction product can be easily obtained. For this reason, a more rigid porous structure can be obtained. Among these, the average particle size is preferably 30 μm or less, and more preferably 10 μm or less. The lower limit of the average primary particle size is not particularly restricted.

The average particle size is a value calculated by observing the cutting surface of the structure in a scanning electron microscope (for example, manufactured by Hitachi High-Technologies Corporation; SEM).

Here, heat storage and heat release are explained by taking calcium hydroxide ($Ca(OH)_2$) as an example.

$Ca(OH)_2$ which is a chemical thermal energy storage material has a constitution in which heat storage (endotherm) is performed accompanied by dehydration and heat release (exotherm) is performed accompanied by hydration (restoration to calcium hydroxide). That is, $Ca(OH)_2$ can repeat heat storage and heat release reversibly by the following reaction.

$$Ca(OH)_2 \leftrightarrow CaO + H_2O$$

Heat storage amount and exotherm amount Q are added thereto to be described as following.

$$Ca(OH)_2 + Q \rightarrow CaO + H_2O$$

$$CaO + H_2O \rightarrow Ca(OH)_2 + Q$$

The below-mentioned clay mineral lies between granular chemical thermal energy storage material powders. By this, a clay mineral has a porous skeletal structure and a structure is formed in which a chemical thermal energy storage material powder is dispersed and retained therein. In the structure, since a chemical thermal energy storage material powder is retained in a dispersed state, and has an excellent diffusibility of water vapor due to its porosity, the above-mentioned reaction can be performed in many types of powders.

The content of the chemical thermal energy storage material in the structure is, based on the total volume of the structure in volume ratio, preferably 20 to 98% by volume (20 to 98% by mass with respect to the total mass of the structure), more preferably 20 to 80% by volume (20 to 80% by mass with respect to the total mass of the structure) and still more preferably (30 to 70% by mass with respect to the total mass of the structure). When the content of the chemical thermal energy storage material is 20% by volume or higher or 20% by mass or higher, the amount of endotherm and exotherm can be kept high. When the amount of chemical thermal energy storage material is 98% by volume or less or 98% by mass or less, a structure having a higher structural strength can be obtained.

—Clay Mineral—

The chemical thermal energy storage material structure of the present invention contains at least one of clay mineral having a layered ribbon structure. The clay mineral having a layered ribbon structure is a clay mineral (layered silicate mineral) in which a plurality of single chains similar to a pyroxene are bonded together to form a tetrahedron ribbon. This clay mineral provides a viscosity to the chemical thermal energy storage material to form a porous structure and to keep the structural strength of the structure high. A diffusibility of water vapor can also be provided.

Examples of the clay mineral include sepiolite [hydrous magnesium silicate represented by $Mg_8Si_{12}O_{30}(OH)_4 \cdot (OH_2)_4 \cdot 8H_2O$], attapulgite [palygorskite; =hydrous magnesium silicate having a palygorskite structure represented by $(Mg,AL)_2Si_4O_{10}(OH) \cdot 4H_2O$, wire diameter 5 μm or less], kaolinite [kaolin; =aluminum silicate represented by $Al_2(Si_2O_5)(OH)_4$, wire diameter 1 μm or less], and one or two of these can be combined to be used.

As the clay mineral, a commercially available product can be used, and examples of the commercially available product include sepiolite made in Turky manufactured by OMI-MINING CO., LTD.

A clay mineral having a layered ribbon structure has an advantage that sintering (aggregation) occurs less compared with the below-mentioned bentonite which does not belong to the clay mineral. In particular, sepiolite has an advantage that the chemical thermal energy storage material is sintered at a temperature near the dehydration temperature of the chemical thermal energy storage material and decrease in the specific surface area by sintering at the temperature is small.

Clay mineral may be appropriately selected depending on the usage considering such advantages.

The chemical thermal energy storage material structure of the present invention may contain bentonite which does not belong to a clay mineral having a layered ribbon structure, and a clay mineral and bentonite may be mixed. Bentonite is a clay mineral having a strong adhesive force compared with a clay having a layered ribbon structure, and can obtain a rigid porous structure by itself (in a state in which a clay mineral is not mixed). Bentonite contributes to improving the adhesive strength to, for example, a metal wall. Accordingly, also by a composition using bentonite, a porous structure in which a pore is formed between chemical thermal energy storage material powders can be obtained.

In the present invention, a configuration in which a clay mineral obtained by mixing a clay mineral having a layered ribbon structure and bentonite is mixed with a powdery chemical thermal energy storage material may also be employed. In this case, the ratio of bentonite is preferably 10 to 40% by mass with respect to a clay mineral having a layered ribbon structure.

The content of the clay mineral in the structure is preferably in a range of 10 to 40% by mass and more preferably in a range of 25 to 35% by mass. When the content of the clay mineral is 10 by mass or higher, a higher structural strength can be easily obtained and when the content of the clay mineral is 40% by mass or less, a higher amount of endotherm and exotherm can be easily obtained.

—Complex Metal Silicate—

The chemical thermal energy storage material structure of the present invention contains 1 of complex metal silicates, or 2 or more of complex metal silicates. Not only by adding a clay mineral to the chemical thermal energy storage material, but also by containing a complex metal silicate in the chemical thermal energy storage material, the structural strength tremensously improves when the structure is made.

The complex metal silicate of the present invention is a reaction product formed by a reaction between the above-mentioned chemical thermal energy storage material and a clay mineral. The complex metal silicate is a complex silicate compound in which 1 or 2 types of alkaline earth metals in chemical thermal energy storage material and clay mineral are contained in a form of, for example, an oxide.

The chemical thermal energy storage material structure of the present invention may be composed of by containing a composition containing a complex metal silicate as a reactant generated by reaction of chemical thermal energy storage material and clay mineral used, as well as by containing another complex metal silicate which is not a reactant generated directly from a chemical thermal energy storage material and a clay mineral used, that is, for example, a complex metal silicate in which the metal composition is different or the like.

Examples of complex metal silicate include magnesium silicate (for example, magnesium metasilicate ($MgSiO_3$), magnesium orthosilicate ($Mg_2SiO_4$), magnesium trisilicate ($Mg_2SiO_8$) or the like), calcium silicate ($CaSiO_3$), calcium magnesium silicate, calcium aluminum silicate, lithium calcium silicate and lithium magnesium silicate.

When a calcium magnesium silicate is contained as a complex metal silicate, for example, calcium hydroxide is used as a chemical thermal energy storage material, and sepiolite is used as a clay mineral and mixing these, and thereafter, the resultant is calcinated in a temperature range of 700° C. or higher and lower than 800° C. By this, calcium magnesium silicate is generated without sintering and can coexist with calcium hydroxide and sepiolite. In this way, in the present invention, such a complex metal silicate is generated when in a mixed state and calcinated, and the silicate may exist uniformly between the thermal energy storage material and clay mineral. By this, an elastic deformability which can absorb a volume change is supplied to a structure in which many pores are generated to be structured in a mesh shape (for example: porous shape), and the strength of the structure can be increased such that the structure endure endoergic reaction and exothermic reaction.

The content of the complex metal silicate in the structure is, with respect to the total mass of the structure, preferably in a range of 2 to 80% by mass, more preferably in a range of 20 to 80% by mass and still more preferably in a range of 30 to 70% by mass. When the content of the complex metal silicate is 2 by mass or higher, the structure exhibits an elastic deformation behavior and a sufficient strength (for example, a structural strength in which an effect of volume change accompanied by endoergic reaction and exothermic reaction can be alleviated) can be obtained, and when the content of the complex metal silicate is 80% by mass or less, it is advantageous to secure a endotherm and exotherm.

In the chemical thermal energy storage material structure of the the present invention, carbon concentration contained in the total mass of the structure is preferably 1% by mass or less. When the carbon concentration is 1% by mass or less, for example, generation and the content of carbonate (for example, $CaCO_3$) in the manufacturing process in which chemical thermal energy storage material and clay mineral are reacted can be inhibited. For this reason, the structure has an excellent structural strength which can endure endoergic reaction and exothermic reaction.

The carbon concentration is 1% by mass or less means that there is substantially no carbon. It is preferred that no carbon be contained (carbon concentration=0 (zero) % by mass).

—Other Components—

In the chemical thermal energy storage material structure of the present invention, other than the above-mentioned components, other components such as inevitable impurities or additives may be contained.

<Method of Producing Chemical Thermal Energy Storage Material Structure>

The chemical thermal energy storage material structure of the present invention may be manufactured in any methods as long as the method is a method in which the structure can contain, together with a chemical thermal energy storage material and a clay mineral, a complex metal silicate which is a reaction product thereof. Among these methods, from the viewpoint of obtaining a high structural strength which can avoid damage or deformation such as cracks by endotherm and exotherm, a structure is preferably manufactured by the below-mentioned production method of chemical thermal energy storage material structure of the present invention.

The method of producing a chemical thermal energy storage material structure of the present invention is composed of, at least, mixing a powdery chemical thermal energy storage material and a clay mineral having a layered ribbon structure, preparing a mixture having a secondary particle size of chemical thermal energy storage material of 50 μm or less (hereinafter, this is also referred to as "mixing process"), molding the obtained mixture (hereinafter, this is also referred to as "molding process"), and calcinating the molded molding under oxygen containing atmosphere at a temperature range of 700° C. or higher and less than 800° C. (hereinafter, this is also referred to as "calcination process").

In the present invention, a chemical thermal energy storage material and a clay mineral are mixed such that the average primary particle size of the powdery chemical thermal energy storage material after mixing can be inhibited to a prescribed value or less, and the mixture thereof is calcinated under oxygen containing atmosphere in a relatively high temperature region of 700° C. or higher and lower than 800° C. By this, a reaction between the chemical thermal energy storage material and the clay mineral can be performed in a mixing state in which the chemical thermal energy storage material fulfills a prescribed particle size range and the uneven distribution thereof is inhibited. Accordingly, the reaction between the chemical thermal energy storage material and the clay mineral proceeds actively, and a large amount of complex metal silicate which is a reaction product can be generated in a scattered way. In addition, a strong structure in which sintering does not occur and endures volume expansion and shrinkage is obtained. Further, since a reaction inhibition due to carbon residue in the atmosphere during the reaction is prevented, a desired structural strength can be stably secured.

—Mixing—

In the mixing of the present invention, a powdery chemical thermal energy storage material and a clay mineral having a layered ribbon structure are mixed to prepare a mixture (for example, mixed powder) having a secondary particle size of the chemical thermal energy storage material of 50 μm or less. The details of the chemical thermal energy storage material and the clay mineral are as mentioned above.

The mixing is not particularly restricted as long as a chemical thermal energy storage material and a clay mineral can be mixed and the secondary particle size of the chemical thermal energy storage material after mixing is 50 μm or less, and can be appropriately selected depending on circumstances. Specific examples of the mixing method include (1) a method in which a powdery chemical thermal energy storage material and a powdery clay mineral are dry mixed to prepare a mixed powder, (2) a method in which both a chemical thermal energy storage material and a clay mineral are ground and dry mixed to prepare a mixed powder, (3) a method in which both a powdery chemical thermal energy storage material and a powdery clay mineral are dispersed and suspended in a medium and wet mixed, and dry powdered by filtratation, drying or the like to prepare a mixed powder, and (4) a method in which a thermal energy storage material suspension in which a chemical thermal energy storage material is dispersed and suspended in a medium and a clay mineral suspension in which a clay mineral is dispersed and suspended in a medium are wet mixed and dry powdered by filtratation, drying or the like to prepare a mixed powder (hereinafter, also referred to as a wet mixing method).

Among the mixing methods, the above-mentioned (4) wet mixing method is preferable. When a powdery chemical thermal energy storage material and a powdery clay mineral are mixed, the primary particles of the individual source powders aggregate to form coarse secondary particles. For this reason, when they are mixed as they are, since the area of contact between them is small, generation of a reaction product decreases and the strength of the structure tends to decrease. On the other hand, by the above-mentioned wet mixing method, secondary particles are crushed by stirring when preparing individual suspensions, and there are less coarse particles in each powder of a chemical thermal energy storage material and a clay mineral, and powders having small average primary particle sizes can be mixed together. For this reason, area of contact between them becomes large and much reaction product is generated to improve the strength of the structure.

In the above-mentioned wet mixing method, the powdery chemical thermal energy storage material or the powdery clay mineral is added to separate media and stirred or the like to obtain suspensions disperesed in media individually, and thereafter they are mixed. Each of the powders is suspended individually in advance to be mixed. By this, a powdery chemical thermal energy storage material having a small average primary particle size diffuses every part of the clay mineral, and the mixing state of the eventually obtained mixed powder can be stably uniform. This is effective when much reaction product is generated during calcination.

The dispersion can be performed by appropriately selecting a known dispersing machine and stirrer and controlling dispersing conditions.

As the medium, a liquid in which a dispersoid can be dispersed and can be removed by filtration, heating or the like can be employed. Examples of the medium include water, solvent or a mixed solvent thereof.

When mixing, other components such as a binder, an antifoaming agent, carboxymethyl cellulose (CMC) may be mixed in a chemical thermal energy storage material or a clay mineral. For example, in cases where a suspension is obtained, when a binder is mixed in, the dispersibility may be improved and the dispersion state may be retained.

Examples of the above-mentioned binder include polyvinyl alcohol (PVA).

In the present invention, the secondary particle size of a chemical thermal energy storage material in the mixture is 50 µm or less. When the secondary particle size of the chemical thermal energy storage material exceeds 50 µm, the generation of a reaction product (complex metal silicate) during calcination decreases and the structural strength after molding decreases. From the viewpoint of improving the generation performance of the reaction product, the secondary particle size of the chemical thermal energy storage material is preferably 30 µm or less and more preferably 10 µm or less. The lower limit of the average primary particle size is not particularly restricted.

The average particle size is a value calculated by observing the cutting surface of the structure in a scanning electron microscope (for example, SEM manufactured by Hitachi High-Technologies Corporation).

When a thermal energy storage material suspension in which a chemical thermal energy storage material are dispersed and suspended is prepared, the concentration of the chemical thermal energy storage material is, with respect to the total mass of a thermal energy storage material suspension, preferably in a range of 1 to 30 parts by mass, and more preferably in a range of 5 to 15 parts by mass. When the concentration of the chemical thermal energy storage material is in the above-mentioned range, stirring is easily performed and the suspension can be uniformly suspended, which is advantageous in terms of work efficiency.

When a clay mineral suspension in which a clay mineral is dispersed and suspended is prepared, the concentration of the clay mineral is, with respect to the total mass of the suspension, preferably in a range of 1 to 10% by mass, and more preferably in a range of 3 to 7% by mass. When the concentration of the clay mineral is in the above-mentioned range, the liquid viscosity is in the vicinity of the thickening limit, which is advantageous in terms of performing stirring favorably. By dispersing and suspending in the vicinity of the thickening limit, a mesh formation of a clay mineral exhibiting a microfibrous shape is accelerated, and a porous structure in which a chemical thermal energy storage material is dispersed is easily obtained. In addition, an elastic deformability can also be provided to the porous structure. By this, an elastic deformation behavior is exhibited, and therefore, damages such as cracks and deformation of the chemical thermal energy storage material structure by a volume change accompanied by a endotherm and exotherm can be more inhibited.

When a clay mineral suspension is prepared, it is preferred that, after adding a clay mineral in a medium, aging (left to stand still) is performed without stirring (also referred to as "preparating suspension"). When, in place of stirring, an aging is performed, a fiber can be unravelled without cutting the fiber. The strength of a mesh structure of the clay mineral can be more improved. The aging is, after addition of the clay mineral to a medium, preferably performed at a temperature of 0° C. to 40° C. for 50 hours or more, and more preferably performed at a temperature of 10° C. to 30° C. for 100 hours or more.

For the mixing ratio of the chemical thermal energy storage material and the clay mineral, the content ratio of the clay mineral with respect to the total mass of the chemical thermal energy storage material and the clay mineral is preferably in a range of 1 to 40% by mass, and more preferably 25 to 35% by mass. When the content ratio of the clay mineral is 1% by mass or higher, which is in a range not too low, the strength is maintained and, for example, even when the structure expands or the like by, for example, a hydration reaction, the structure is hard to collapse. When the content ratio of the clay mineral is 40% by mass or less, which is in a range not too high, the amount of the chemical thermal energy storage material becomes relatively not too small, and the heat storage amount can be maintained high.

After preparing a suspension and mixing the chemical thermal energy storage material and the clay mineral, it is preferred to obtain a mixed powder (preferably, a granulated powder) in preparation of the below-mentioned molding. Examples of methods for obtaining a mixed powder after mixing include a method by suction filtration.

The secondary particle size of the obtained granulated powder is preferably 1 mm or less, more preferably about 100 µm and still more preferably 50 to 150 µm. By making the secondary particle size in a range not too small, the fluidity can be maintained, and by making the secondary particle size in a range not too large, the moldability in a thin shape can be retained.

In the granulated powder after mixing, the moisture content is preferably adjusted by an ultrasonic humidifier or a dryer. The optimum moisture content of the granulated powder largely varies depending on the percentage of the clay. The higher the percentage of the clay, the higher the moisture content is required to be. The moisture content is preferably adjusted to 1 to 20% by mass with respect to the total mass. By making the moisture content of the granulated powder in a range too low, the moldability in a molding becomes favorable, and by making the moisture content of the granulated powder in a range too high, the fluidity can be favorably maintained.

—Molding—

In the molding in the present invention, the molding is performed by using the mixture obtained in the above-mentioned mixing (preferably a mixed powder and more preferably a granulated powder). During the molding, heating may be performed as long as water does not evaporate.

The molding method is not particularly restricted, and a conventionally know molding method may be selected depending on the objective or the like. Examples of the molding method can be applied press molding which uses a press plate or the like and a molding process using a mold such as a metal mold.

The molding condition is preferably a pressure condition under room temperature, at a pressure of 40 to 80 MPa for 1 to 30 seconds. Here, the amount of the mixture which is to be molded (preferably a granulated powder) is preferably 15 to 20 ml in volume.

—Calcinating—

In the calcinating in the present invention, the molding molded in the above-mentioned molding is calcinated under an oxygen containing atmosphere in a temperature range of 700° C. or higher and less than 800° C.

The calcinating is performed under an oxygen containing atmosphere. By performing the calcination under an oxygen containing atmosphere, a binder contained in the structure, for example, by being mixed in in the mixing or the like or an organic substance derived from a clay mineral and the like are combusted to be decomposed into water ($H_2O$) and carbon dioxide ($CO_2$; hereinafter, also referred to as $CO_2$ for short). By this, carbonation of the chemical thermal energy storage material in the calcination atmosphere (e.g.: in the case of Ca containing chemical thermal energy storage material, the generation of $CaCO_3$) can be inhibited. That is, while the residual carbon causes carbonation of the chemical thermal energy storage material, the oxidation of carbon is accelerated to inhibit the carbonation. By this, reaction inhibition between the chemical thermal energy storage material and the clay mineral is prevented and the heat storage amount and the structural strength of the structure can be improved.

The oxygen containing atmosphere is an atmosphere having an oxygen concentration of 10% or higher, and preferably is an atmosphere having an oxygen concentration of 15% or higher. The upper limit of the oxygen concentration is not particularly restricted. For example, the oxygen containing atmosphere may be air atomosphere. The introduction of oxygen into the atmosphere is performed at the heating start point of the calcination from the viewpoint of carbonation inhibition after the heating start point of the calcination. Further, the introduction of oxygen into atmosphere is desired to be maintained after the calcination until the below-mentioned cooling process.

By making the oxygen concentration 10% or higher in order not to be short of oxygen concentration, combustion of additives or the like is sufficiently performed to inhibit the residue of carbon. By this, the generation reaction of metal silicate proceeds favorably, and the strength can be exhibited.

Calcinating in the present invention is performed in a temperature range of 700° C. or higher and lower than 800° C. For example, when calcium hydroxide is used as the chemical thermal energy storage material, and sepiolite is used as the clay mineral, CaO generated by a dehydration reaction of calcium hydroxide and sepiolite are reacted at about 1:1 (mass ratio) to generate merwinite ($3CaO.MgO.2SiO_2$; complex metal silicate).

This temperature range refers to a temperature of an atmosphere in which calcinating is performed, and is adjusted by measuring the ambient temperature and controlling the ambient temperature.

When the calcination temperature is less than 700° C., decomposition products derived from the chemical thermal energy storage material (for example, in the case of calcium hydroxide, CaO generated by dehydration reaction of "Ca$(OH)_2 \rightarrow CaO+H_2O$") and the clay mineral are hard to be reacted, and the improvement of the structural strength of the structure is not expected. Further, when the calcination temperature exceeds 800° C., sintering occurs to cause grain coarsening, and the amount of the generated product is small, and the improvement of the structural strength of the structure cannot be expected. Among the above-mentioned temperature range, the range of 730° C. or higher and 780° C. or lower is more preferable from the viewpoint of reducing sintering, maintaining the generation performance of a reaction product between the chemical thermal energy storage material and the clay mineral, and securing the structural strength of the structure.

The calcination time may be appropriately selected depending on conditions such as the calcination temperature, the scale, the types of the chemical thermal energy storage material or the clay mineral or the mixing ratio. In the present invention, the aspect in which calcinating is performed in a temperature range of 700° C. or higher and lower than 800° C. for 15 min to 60 min (further preferably, 15 min to 45 min) is preferred. When the calcination time is 15 min or longer, a reaction product (complex metal silicate) which is required for effectively increasing the strength of the structure can be obtained. Further, when the calcination time is 60 min or less, the particle coarsening by sintering is prevented and the the strength improvement effect of the structure is high.

Among these, for the above-mentioned similar reason, the aspect in which the calcination is performed in a temperature range of 730° C. or higher and 780° C. or lower for 20 min to 40 min is more preferred.

The rate of temperature increase during the calcination is preferably in a range of 40° C./min or higher. When the rate of temperature increase is 40° C./min or higher, a reaction between $CO_2$ generated by the combustion of a binder or organic substances derived from the clay mineral and the chemical thermal energy storage material can be inhibited to a small degree. When the rate of temperature increase is too slow, the amount of carbonate (for example, $CaCO_3$) generated by the reaction between $CO_2$ generated by the combustion of the binder, organic substances derived from the clay mineral or the like and a non-dehydrated chemical thermal energy storage material (for example, $Ca(OH)_2$) increases. Thereafter, even when decomposition of carbonate at a higher temperature (for example, decomposition of $CaCO_3$ near 500° C.: $CaCO_3 \rightarrow CaO+CO_2$) occurs, the decomposition thereof becomes insufficient and the carbonate (for example, $CaCO_3$) remains. As a result, the strength of the structure becomes insufficient and collapse or decrease in the density of the chemical thermal energy storage material easily occurs, which can be avoided by keeping the rate of temperature increase 40° C./min or higher.

The rate of temperature increase during the calcination is preferably higher because carbonation of the chemical thermal energy storage material can be prevented, and the rate of temperature increase is preferably 100° C./min or higher and particularly preferably 150° C./min or higher. The rate of temperature increase has no upper limit in particular.

The rate of temperature increase may also be preferably adjusted bridging the vicinity of the temperature (for example, in the case of $CaCO_3$, near 500° C.) where the decomposition of carbonate (for example, $CaCO_3$) occurs. That is, the amount of carbonate (for example, $CaCO_3$) easily increases by the reaction with $CO_2$ up to a decomposition temperature where decomposition reaction of a carbonate occurs (for example, in the case of $CaCO_3$, near 500° C.). For this reason, the rate of temperature increase is assumed to be 40° C./min or higher. For example, a time required for reaching the decomposition temperature of carbonate (for example, in the case of CaCO$_3$, 500° C.) may be restricted and after reaching the decomposition temperature (for example, in the case of CaCO$_3$, 500° C.) (>500° C.), the condition may be switched to a desired heating condition.

In the calcinating, it is preferred to cool the calcinated molding (structure) (hereinafter, also referred to as a cooling). The rate of temperature decrease during the calcination is preferably in a range of 20° C. /min or higher. When the rate of temperature decrease during calcination is 20° C. /min or higher, a reaction between water in the atmosphere and decomposition products derived from the chemical thermal energy storage material (CaO generated from the dehydration reaction, for example, Ca(OH)$_2$→CaO+H$_2$O) is hard to occur, and hydroxides (Ca(OH)$_2$) is hard to be generated and the generation of carbonate (for example, CaCO$_3$) by reacting CO$_2$ in the atmosphere can be inhibited. By this, the strength of the structure can be kept high and collapse and decrease in the density of the chemical thermal energy storage material can be prevented.

In the present invention, the rate of temperature decrease refers to an average cooling rate from the calcination temperature to 50° C.

The the rate of temperature decrease during the calcination is preferably higher since the carbonation of the chemical thermal energy storage material can be prevented. The rate of temperature decrease from the calcination temperature (700° C. or higher and lower than 800° C.) to 50° C. is preferably adjusted to 20° C./min or higher. The rate of temperature decrease is preferably 100° C./min or higher, and particularly preferably 150° C./min or higher. The rate of temperature decrease has no upper limit in particular.

When the above-mentioned rate of temperature increase is assumed, the aspect in which cooling is performed at a rate at which a time required from the calcination temperature to 50° C. is 30 min or less is preferred.

As a prefered specific example, an aspect in which, when a Ca-containing chemical thermal energy storage material is used, after the temperature of the material is increased at a rate in which the required time from the heating start to the ambient temperature 500° C. is 10 min or less, the material is calcinated (preferably 15 to 45 min) in a temperature range of 700° C. or higher and less than 800° C., and thereafter, the temperature of the material is decreased at a rate in which the required time from the calcination temperature to 50° C. is 30 min or less, is preferred.

Here, taking a case where calcium hydroxide is used as the chemical thermal energy storage material, and sepiolite is used as the clay mineral as one example, the detailed reaction will be described.

Figure 1:
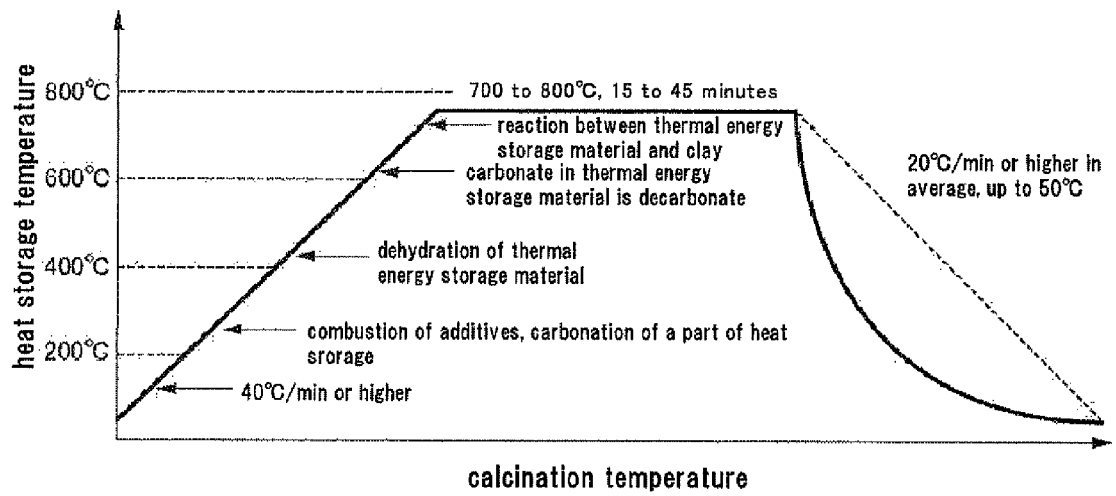
FIG. 1 is a schematic diagram illustrating a reaction during calcination in every temperature.

As illustrated in FIG. 1, additives and organic substances in the clay mineral start combusting at a temperature of about 200° C. or higher to generate water and CO$_2$. A part of the chemical thermal energy storage material is easily carbonated by the CO$_2$ generated here. In the calcinating, the below-described dehydration reaction starts at a temperature of about 400° C. from the start of heating, and oxide is generated.

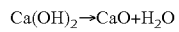

In parallel to this, by the reaction with oxygen in the atomosphere, a binder or organic substances derived from clay mineral are combusted to generate H$_2$O and CO$_2$. Here, if Ca(OH)$_2$ exists, the following reaction proceeds at a temperature of lower than 50° C. to generate CaCO$_3$.

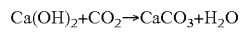

Next, when the temperature is about 500° C. or higher, carbonate in the chemical thermal energy storage material decarboxylates. For example, CaCO$_3$ decomposes at a temperature of about 600° C. or higher, to obtain CaO and CO$_2$. Organic substances derived from sepiolite combusts to generate H$_2$O and CO$_2$.

When the temperature is about 700° C. or higher, the reaction between the chemical thermal energy storage material and the clay mineral proceeds. Accordingly, for example, CaO and sepiolite react at a mass ratio of about 1:1 to generate merwinite (3CaO.MgO.2SiO$_2$; complex metal silicate). Since this merwinite coexists with Ca(OH)$_2$ and sepiolite, the strength of the structure improves and even when a volume change due to endoergic reaction and exothermic reaction occurs, the generation of damages such as cracks or deformation is effectively prevented.

In this way, by the generation of metal silicate, the strength after calcinating tremendously improves.

<Chemical Heat Accumulator>

The chemical heat accumulator of the present invention includes: the above-mentioned chemical thermal energy storage material structure of the present invention; and a gas flow path in which a reactant gas circulates and which is provided such that the circulating reactant gas is in contact with a chemical thermal energy storage material structure.

In the following, the embodiment of the chemical heat accumulator of the present invention will be described with reference to FIGS. 2 to 7. As an example of a reactant gas, a case in which water vapor is used is illustrated. In this case, as the chemical thermal energy storage material, inorganic hydroxides such as hydroxides of alkaline earth metal are preferred.

Figure 2:
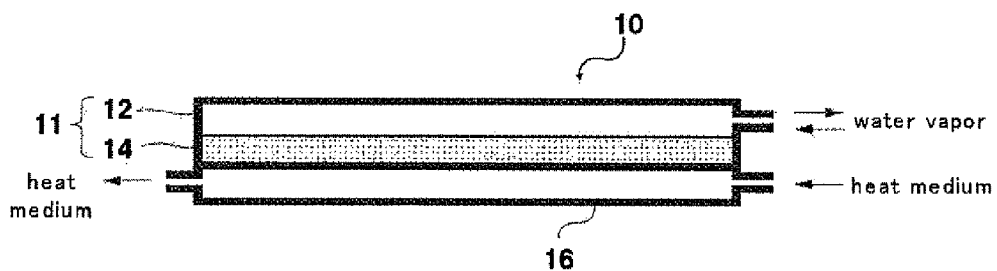
FIG. 2 is a cross-sectional view illustrating a schematic diagram of a chemical heat accumulator of an embodiment.

FIG. 2 illustrates an aspect in which a gas flow path is provided on one side of a plate-shape chemical thermal energy storage material.

As illustrated in FIG. 2, a chemical heat accumulator 10 of the present embodiment includes, inside a reactor 11, a plate-shaped chemical thermal energy storage material 14 which is placed to be in contact with the inner wall of the reactor 11, a gas flow path 12 through which water vapor is supplied or discharged to allow water vapor to be in contact with one side which is not in contact with the inner wall of the reactor. The gas flow path 12 is vacuum sealed, and only water vapor can circulate. On the opposite of the side of a chemical thermal energy storage material 14 on which the gas flow path 12 is provided, a heat exchanger 16 is arranged via a wall. A heat exchanger 16 can exchange heat with a heat medium by circulating a heat medium in a pipe.

As a heat medium, a fluid generally used as a heat medium body, for example, alcohols such as ethanol, water, oils, a mixture thereof or the like can be used.

The reactor is preferably formed of a metal having a high heat conductivity and corrosivity. The shape of the reactor is not particularly restricted, and may be decided by the shape of the chemical thermal energy storage agent. For example, when the shape of the chemical thermal energy storage material is a plate-shape, the reactor is suitably a rectangular, and when the shape of the chemical thermal energy storage material is a cylinder shape, the reactor is suitably a cylinder.

Figure 3:
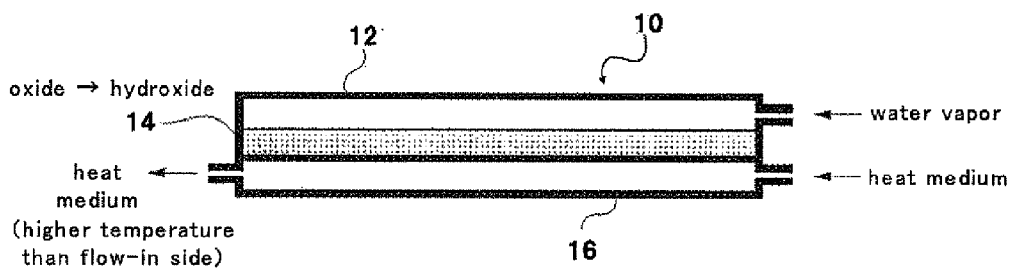
FIG. 3 is an explanatory diagram which explains the movement when water vapor flows in the chemical heat accumulator of FIG. 2.

Specifically, for example, in the case of using calcium hydroxide as the chemical thermal energy storage material, first, water vapor is supplied to calcium oxide (CaO) after calcination placed in the reactor 11 through the gas flow path 12 as illustrated in FIG. 3, the following reaction proceeds to generate heat.

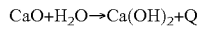

Here, the heat medium circulating in the heat exchanger 16 exchanges heat with the chemical thermal energy storage material 14. By keeping the temperature of the chemical thermal energy storage material at a prescribed temperature or lower, the above-mentioned reaction proceeds effectively and the heat storage efficiency improves. The temperature of the heat medium which flows in the heat exchanger 16 is increased, and the medium flows out.

Figure 4:
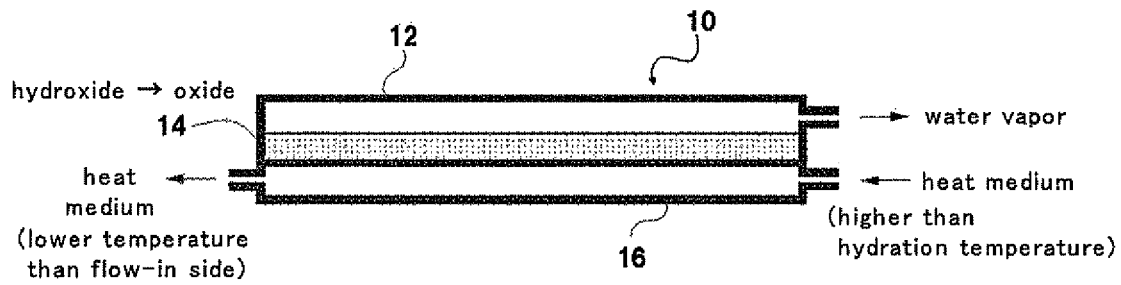
FIG. 4 is an explanatory diagram which explains the movement when the temperature of the chemical thermal energy storage material of the the chemical heat accumulator in FIG. 2 is increased.

On the contrary, in circumstances where calcium hydroxide ($Ca(OH)_2$) exists in the reactor 11, as illustrated in FIG. 4, a heat medium whose temperature is increased with the required heat for dehydration reaction Q or higher flows in the heat exchanger 16, and the dehydration reaction represented by the following reaction formula proceeds. Water vapor is discharged and a reaction proceeds efficiently by the elevated temperature of the heat medium, and the temperature of the heat medium which flows in the heat exchanger 16 is decreased at a temperature lower than the temperature of those which flowed in, and the heat medium flows out.

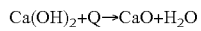

Figure 5:
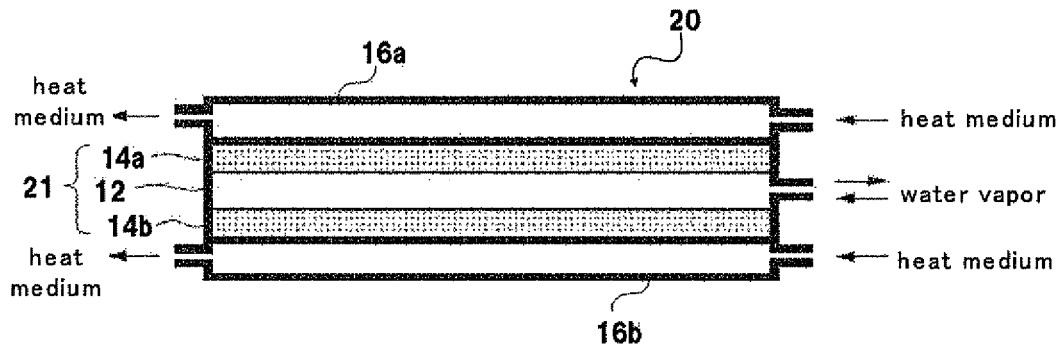
FIG. 5 is a cross-sectional view illustraing a schematic diagram of a chemical heat accumulator of another embodiment.

In other embodiments, as illustrated in FIG. 5, an aspect in which a structure in which a gas flow path is placed between the two plate-shaped chemical thermal energy storage materials is sandwitched by two heat exchangers may be employed.

A chemical heat accumulator 20 of this embodiment includes, inside a reactor 21: a gas flow path 12 which supplies and discharges water vapor; and two plate-shaped chemical thermal energy storage materials 14a, 4b placed such that they sandwitch the gas flow path 12 being in contact with the inner wall of the reactor 21. The above-mentioned reaction can be performed by allowing water vapor to be in contact with one of sides which are not in contact with the inner wall of the chemical thermal energy storage material 14a, 14b. On the opposite side of side on which the gas flow path 12 is provided on the chemical thermal energy storage materials 14a, 14b, heat exchangers 16a, 16b are arranged via a wall respectively. In each of the heat exchangers 16a, 16b, heat medium circulates in pipes to exchange heat with the heat medium.

Figure 6:
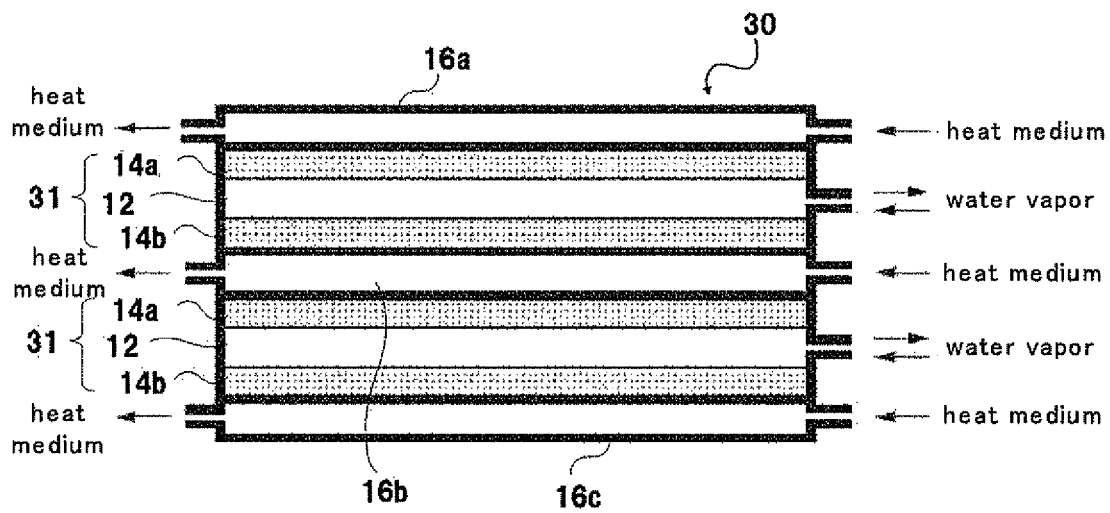
FIG. 6 is a cross-sectional view illustraing a schematic diagram of a chemical heat accumulator of another embodiment.

As a still another aspect, as illustrated in FIG. 6, an aspect in which a structure in which a gas flow path is placed between two plate-shaped chemical thermal energy storage materials and a heat exchanger which exchanges heat with a chemical thermal energy storage material may be employed.

A chemical heat accumulator 30 of this embodiment include, inside a reactor 31: a gas flow path 12 which supplies and discharges water vapor; and two plate-shaped chemical thermal energy storage materials 14a, 14b placed such that they sandwitch the gas flow path 12 being in contact with the inner wall of the reactor 31. The above-mentioned reaction can be performed by allowing water vapor to be in contact with one of sides which are not in contact with the inner wall of the chemical thermal energy storage material 14a, 14b. On the opposite side of side on which the gas flow path 12 is provided on the chemical thermal energy storage materials 14a, 14b, heat exchangers 16a, 16b, 16c are arranged via a wall respectively. In each of the heat exchangers 16a, 16b, 16c heat medium circulates in pipes to exchange heat with the heat medium.

Figure 7:
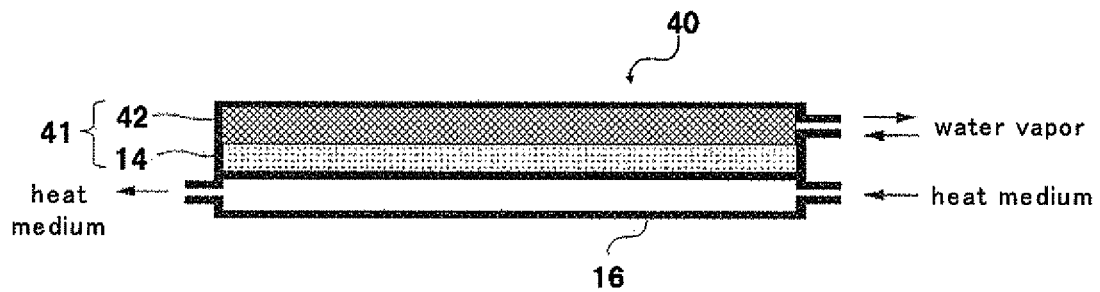
FIG. 7 is a cross-sectional view illustraing a schematic diagram of a chemical heat accumulator provided with a gas flow path retaining structure of another embodiment.

As another aspect, FIG. 7 illustrates an aspect in which, on one side of a plate-shaped chemical thermal energy storage material, a gas flow path formed by providing a gas flow path retaining structure which retains the shape of the chemical thermal energy storage material structure and which secures a gas flow path is provided.

A chemical heat accumulator 40 as illustrated in FIG. 7 includes, inside a reactor 41: a plate-shaped chemical thermal energy storage material 14 placed to be in contact with the inner wall of the reactor 41; and a gas flow path 42 which supplies and discharges water vapor. The gas flow path 42 is formed by providing a pore network made of stainless steel, as a porous plate through which a gas can pass. The pore network is fixed on one of sides which are not in contact with the innner wall of the chemical thermal energy storage material 14, and the filtration accuracy thereof is finer than the mean particle size in the chemical thermal energy storage material 14, collapse or deformation of the chemical thermal energy storage material structure accompanied by heat expansion and shrinkage are prevented and when granular or powdery thermal energy storage material is generated, a gas flow path 42 is not blocked by these particles. This pore network has a porous shape, and water vapor which is flowed in can be in contact with the chemical thermal energy storage material 12.

The filtration accuracy (E) is varies depending on manufacturers, and usually refers to a particle diameter having a removing efficiency of about 50 to 98%. For example, the strucure having a filtration accuracy of 100 μm means that about 50 to 98% of particles having a particle size of 100 μm can be removed. The filtration accuracy is calculated by passing a liquid in which globular latex beads or test dusts are dispersed through a test filter, sampling the liquids before passing the filter and after passing the filter, and measuring the number of particles having each particle size, according to the following formula:

$$E[\%]=\{(IN_p-OUT_p)\times IN_p\}\times 100$$

[$IN_p$: the number of particle before passing the filter, $OUT_p$: the number of particle after passing the filter]

The gas flow path retaining structure preferably has a filtration accuracy finer than the mean particle size of the particle constituting the chemical thermal energy storage material structure. Here, the mean particle size means a secondary particle size of a granulated powder, and a value calculated by a general particle sizing method such as a laser diffraction scattering method. In the present invention, the difference between the mean particle size and the filtration accuracy is preferably 10 to 50 μm.

Figure 8:
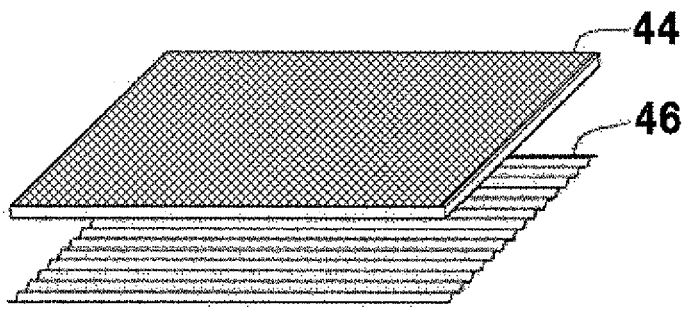
FIG. 8 is a perspective view illustrating one example of a gas flow path retaining structure.
Figure 9:
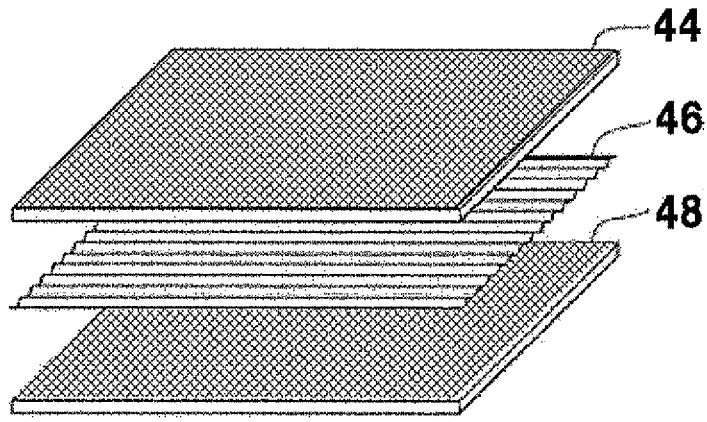
FIG. 9 is a perspective view illustrating another example of a gas flow path retaining structure.

A gas flow path retaining structure is in contact with the chemical thermal energy storage material structure to retain the shape thereof, and secures the gas flow path, when the molded chemical thermal energy storage material collapeses and a granular or powdery thermal energy storage material is generated, not to be blocked by these particles. Specifically, the gas flow path retaining structure can be formed by using a mesh material such as pore network having pores, porous plate such as a mesh filter, a concavoconvex plate having, for example, a sine curve corrugated shape, or a notched shape provided with cyclic sharp angled folding portions alternatively on the back side and the front side thereof. As a specific example, as shown in FIG. 8, the structure may be such that, on the surface of the chemical thermal energy storage material 14, a pore network 44 and a corrugated plate 46 having a sine curve shaped cross section are layered in the mentioned order, and water vapor flowed in through concave portions of a corrugated plate 46 passes the pore network 44 to be in contact with the chemical thermal energy storage material. In FIG. 5 and FIG. 6, the structures may be such that, as illustrated in FIG. 9, the gas flow path 12 is formed by laminating a pore network 44 made of a stainless steel, a corrugated plate 46 having a sine curve shaped cross section and a pore network 48 made of a stainless steel, and water vapor flowed in through concave portions of the back side and the front side of a corrugated plate 46 passes each of the pore networks 44, 48 to be in contact with chemical thermal energy storage materials 14a, 14b.

The pressure loss of the gas flow path retaining structure is preferably 10 kPa or less. When the pressure loss is 10 kPa or less, the inhibition of a reaction between a reactant gas and a chemical thermal energy storage material (for example, when water vapor is circulated as a reactant gas, a hydration reaction between water vapor and the chemical thermal energy storage material) can be prevented. The smaller the above-mentioned pressure loss is, the more preferable, and the loss is preferably 5 kPa or less.

The pressure loss is determined by measuring a pressure at a gas inlet and a pressure in a space where the chemical thermal energy storage material is not placed where the chemical thermal energy storage material is to be placed and calculating the difference therebetween.

The heat capacity of the gas flow path retaining structure is preferably 10% or less with respect to the heat capacity of the whole reaction chamber. By inhibiting the heat capacity 10% or less, the exotherm properties during the reaction does not decrease. The smaller the above-mentioned heat capacity is, the more preferable, and the heat capacity is preferably 5% or less.

The compressive strength of the gas flow path retaining structure is preferably larger than the expansion force of the chemical thermal energy storage material structure. The compressive strength refers to a maximum stress (maximum load) which the strucure can endure with respect to the compressive load corresponding to the force when the chemical thermal energy storage material structure expands (expansion force), and determined by dividing the maximum load by the cross-section of the test piece which is subjected to a compression test.

The compressive strength is preferably in a range of 1.2 times the expansion force.

In the above embodiment, as a heat exchanger, an example using a circulating system provided with a heat medium and a heat exchange pipe circulating the heat medium has been illustrated. As the heat exchanger, a generally used In the present invention, as mentioned above, even when the chemical thermal energy storage material repeats exapansion and shrinkage accompanied by endoergic reaction and exothermic reaction, the generation of damages such as cracks or deformations of the structure can be inhibited and also a gas flow path in which a reactant gas circulates is secured. A system in which heat storage and heat utilization can be stably performed for a long period of time can therefore be constructed.

EXAMPLES

The present invention will now be described more specifically by way of Examples, but not limited thereto, without deviating from the spirit of the the invention. Unless otherwise specified, "part" and "%" herein refers to those based on mass.

Example 1

—Preparation of Mixed Powder—

By the following procedure, a mixed powder suspension in which a powdery chemical thermal energy storage material and a powdery sepiolite were mixed was prepared.

(1) Preparation of Suspension of Thermal Energy Storage Material

As the chemical thermal energy storage material, Ibuki Lime NEO-1 manufactured by OMI-MINING CO., LTD. (slaked lime; $Ca(OH)_2$=95% by mass, $CaCO_3$=3% by mass, impurity=2% by mass, average primary particle size=10 μm) was prepared. This was mixed with an ion exchanged water so as to attain a concentration of 10% (based on mass) and stirred by a stirrer for 4 minutes to prepare a 10% by mass suspension of the chemical thermal energy storage material.

(2) Preparation of Sepiolite Suspension

As a clay mineral, MIRACLAY (registered trademark) P series, sepiolite powder P-300 made in Turky, manufactured by OMI-MINING CO., LTD ($MgSi_{12}O_{30}(OH)_4(OH_2)_4 \cdot 8H_2O$; fibrous) was prepared. This was mixed with an ion exchanged water without stirring to obtain a 3% by mass liquid. The liquid was subjected to an aging (left to stand still) processing to prepare a sepiolite suspension. At this time, the mixing amount of sepiolite exhibited a thickening limit concentration at 3% by mass. The thickening limit concentration was calculated by change in the viscosity when the concentration of sepiolite was increased.

(3) Manufacture of Mixed Powder

The thermal energy storage material suspension and the sepiolite suspension obtained above were mixed so as to attain the sepiolite concentration of 1% by mass of the sum of thermal energy storage material and sepiolite to be stirred for 30 seconds by a stirrer. After stirring, the mixed suspension was subjected to suction filtration, ground, dried and granulated to obtain a granulated powder (mixed powder).

The average primary particle size of $Ca(OH)_2$ powder in the obtained mixed powder was measured with SALD-2000A manufactured by SHIMADZU CORPORATION by laser diffractometry. The result was 30 μm.

To the mixed powder obtained above, as a binder, 2% by mass aqueous solution of polyvinyl alcohol (manufactured by JAPAN VAM & POVAL CO., LTD.) was added in an amount of 50% by mass of the above mixed powder. At this time, the granulation was performed so as to obtain a secondary particle size of 1 mm or less, and the resultant was dried, and the moisture content was adjusted to 2% by mass of the total mass.

—Mold—

About 15 ml of the above granulated powder was weighed and subjected to a uniaxial press under room temperature (25° C.) at 44 MPa for 30 seconds to perform molding. Then, a molding of about 64mm×28 mm×3 mm was manufactured.

The secondary particle size was determined by observing, in a scanning electron microscope (SEM), the cutting surface of the molding which was cut in a desired size.

—Calcination—

Next, the obtained molding was heated under air atomosphere at a rate of temperature increase of 50° C./min., retained at 750° C. for 30 minutes, calcinated, and then natural cooled. At this time, the rate of temperature decrease was 30° C./min. By performing calcination under air atomosphere, organic substances in a binder or a clay mineral were completely combusted (generation of $H_2O$ and $CO_2$; under the presence of $Ca(OH)_2$, decomposition of further generated $CaCO_3$ into $H_2O$ and $CO_2$). By performing in such a way, the inhibition of the reaction between a chemical thermal energy storage material and a clay mineral by carbonation of Ca was prevented.

As above, a chemical thermal energy storage material structure was manufactured.

Figure 10:
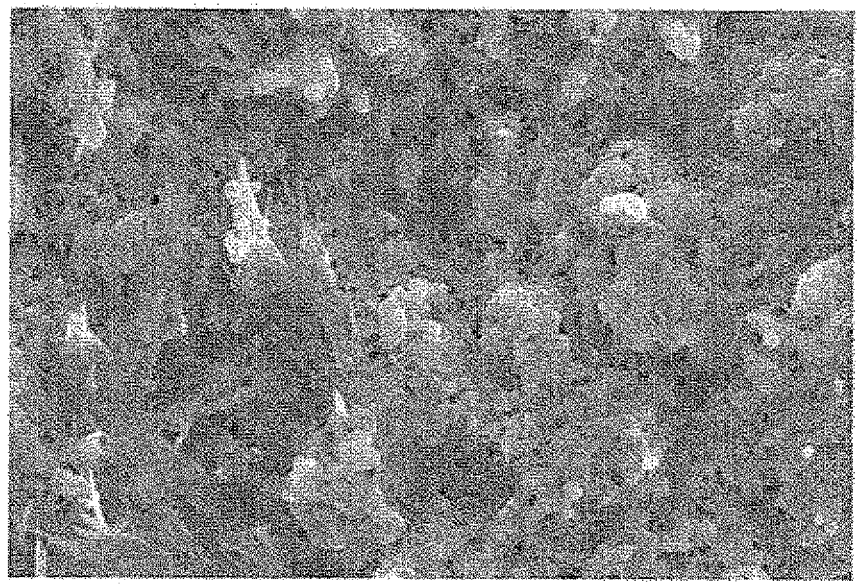
FIG. 10 is (a) an SEM cross-sectional photograph illustrating at a magnification of 20000 one example of the internal structure of the chemical thermal energy storage material structure of the present invention, and (b) an SEM cross-sectional photograph illustrating at a magnification of 40000 one example of the internal structure of the chemical thermal energy storage material structure of the present invention.
Figure 10:
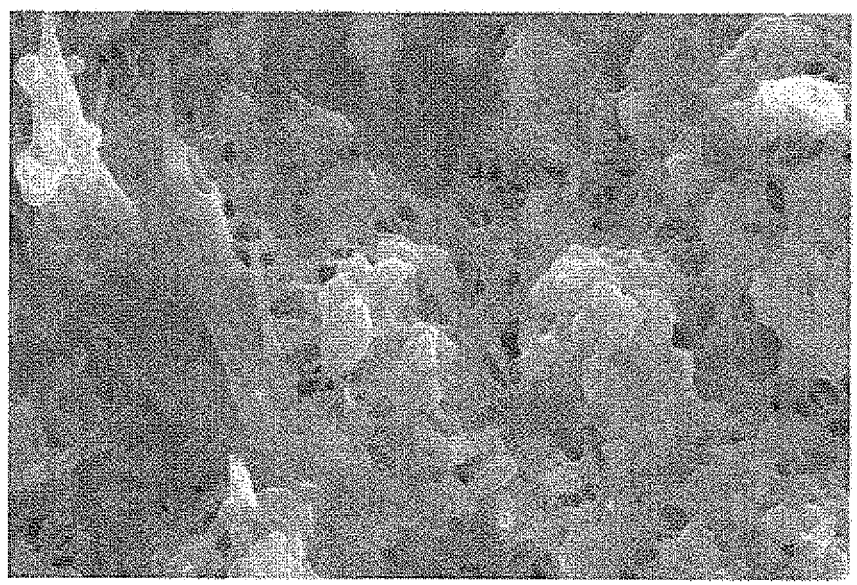

A part of chemical thermal energy storage material structure manufactured above was cut off. The cutting surface was photographed by a scanning electron microscope (manufactured by Hitachi High-Technologies Corporation; SEM) to observe the internal structure of the structure. FIG. 10 is SEM photographs illustrating the internal structure of the chemical thermal energy storage material structure manufactured in the Example.

As illustrated in FIG. 10, a mesh-shaped porous structure having many pores was formed in the structure.

The carbon concentration in the manufactured chemical thermal energy storage material structure was measured by a combustion method. As the result, the carbon concentration was 0.1% by mass of the total mass of the structure.

Figure 11:
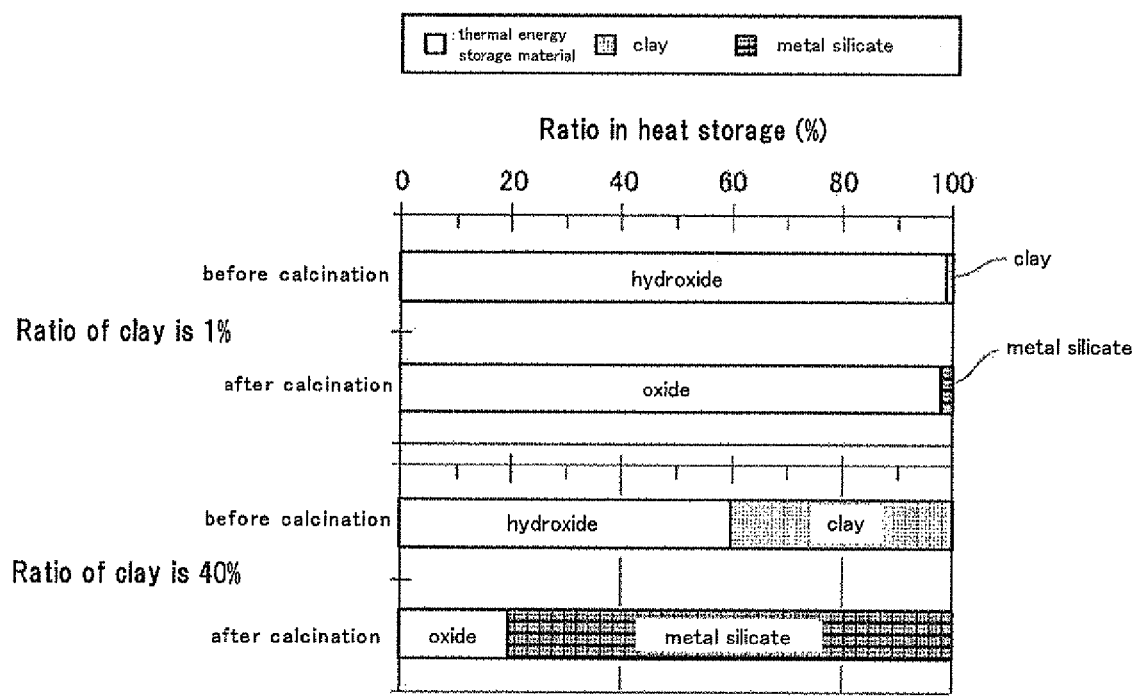
FIG. 11 is a diagram illustrating an approximate composition before and after calcination when the compounding ratio (based on mass) of clay mineral is 1% and 40%.

In cases where the mixing ratio of clay mineral in the Example is 1% by mass, as illustrated in FIG. 11, chemical thermal energy storage material (oxide) was 98% by mass, and the generation amount of merwinite (reaction product; $3CaO.MgO.0.2SiO_2$; metal silicate) was 2% by mass.

—Evaluation—

For the chemical thermal energy storage material structure after calcination, the below evaluation was performed. The evaluation results are illustrated in the Table 1 below.

(1. Damage•Deformation)

The manufactured chemical thermal energy storage material structure was heated to 100° C. and made in contact with saturated water vapor at a temperature of 50° C. to be hydrated. At this time, the presence of the generation of cracks, deformations of the structure was observed by visual inspection to perform an evaluation according to the evaluation criteria below.

<Evaluation Criteria>
A: No crack and deformation during hydration
B: Little deformation during hydration
C: Crack and deformation observed during hydration
D: Considerable amount of generation of crack and deformation during hydration
E: Broken during hydration Examples 2 to 4

A chemical thermal energy storage material structure was manufactured in the same manner as in Example 1 except that the mixing ratio of the sepiolite suspension used for preparing a mixed powder suspension is changed such that the sepiolite concentration is the ratio illustrated in the Table 1 below. Together with the observation of the internal structure of the structure and the measurement of the carbon concentration, the evaluation was performed. The evaluation results are illustrated in the Table 1.

In the Example 4 in which the mixing ratio of the clay mineral is 40% by mass, as illustrated in FIG. 11, the chemical thermal energy storage material (oxide) was 20% by mass, and the generation amount of merwinite (metal silicate) was 80% by mass.

Example 5

A chemical thermal energy storage material structure was manufactured in the same manner as in Example 3 except that the temperature during calcination was changed from 750° C. to 700° C. Together with the observation of the internal structure of the structure and the measurement of the carbon concentration, the evaluation was performed. The measurement and evaluation results are illustrated in the Table 1.

Examples 6, 7

A chemical thermal energy storage material structure was manufactured in the same manner as in Example 3 except that the calcination time at 750° C. was changed from 30 min to 10 min or 60 min individually. Together with the observation of the internal structure of the structure and the measurement of the carbon concentration, the evaluation was performed. The measurement and evaluation results are illustrated in the Table 1.

Examples 8 to 12

A chemical thermal energy storage material structure was manufactured in the same manner as in Example 3 except that the rate of temperature increase and the rate of temperature decrease during calcination were changed as illustrated in Table 1 below. Together with the observation of the internal structure of the structure and the measurement of the carbon concentration, the evaluation was performed. The measurement and evaluation results are illustrated in the Table 1.

Example 13

A chemical thermal energy storage material structure was manufactured in the same manner as in Example 1 except that the temperature during calcination was changed from 750° C. to 780° C. Together with the observation of the internal structure of the structure and the measurement of the carbon concentration, the evaluation was performed. The measurement and evaluation results are illustrated in the Table 1.

Comparative Example 1

A chemical thermal energy storage material structure was manufactured in the same manner as in Example 3 except that, in "Preparation of mixed powder", the secondary particle size of the chemical thermal energy storage material in the mixed powder which is manufactured by mixing or the like a thermal energy storage material suspension and a sepiolite suspension was adjusted to 100 μm. Together with the observation of the internal structure of the structure and the measurement of the carbon concentration, the evaluation was performed. The measurement and evaluation results are illustrated in the Table 1.

Comparative Example 2

A chemical thermal energy storage material structure was manufactured in the same manner as in Example 3 except that calcination was performed under a reduced pressure of $10^{-4}$ MPa (vacuum of oxygen concentration 200 ppm or less). Together with the observation of the internal structure of the structure and the measurement of the carbon concentration, the evaluation was performed. The measurement and evaluation results are illustrated in the Table 1.

Comparative Examples 3, 4

A chemical thermal energy storage material structure was manufactured in the same manner as in Example 3 except that the temperature during calcination was changed from 750° C. to 800° C. or 600° C. individually. Together with the observation of the internal structure of the structure and the measurement of the carbon concentration, the evaluation was performed. The measurement and evaluation results are illustrated in the Table 1.

Comparative Example 5

A chemical thermal energy storage material structure was manufactured in the same manner as in Example 1 except that the sepiolite suspension was not mixed during preparing a mixed powder suspension. Together with the observation of the internal structure of the structure and the measurement of the carbon concentration, the evaluation was performed. The evaluation results are illustrated in the Table 1.

TABLE 1

| | Manufacture condition | | | | | | |
|---|---|---|---|---|---|---|---|
| | Mixing | | Calcination | | | | |
| | Clay mineral mixing ratio [% by mass] *1 | Average particle size of thermal energy storage material [μm] *2 | Atmosphere | Rate of temperature increase [° C./min.] | Temperature [° C.] | Time [min.] | Rate of temperature decrease [° C./min.] |
| Example 1 | 1 | 30 | air | 50 | 750 | 30 | 30 |
| Example 2 | 10 | 30 | air | 50 | 750 | 30 | 30 |
| Example 3 | 30 | 30 | air | 50 | 750 | 30, | 30 |
| Example 4 | 40 | 30 | air | 50 | 750 | 30 | 30 |
| Example 5 | 30 | 30 | air | 50 | 700 | 30 | 30 |
| Example 6 | 30 | 30 | air | 50 | 750 | 10 | 30 |
| Example 7 | 30 | 30 | air | 50 | 750 | 60 | 30 |
| Example 8 | 30 | 30 | air | 30 | 750 | 30 | 30 |
| Example 9 | 30 | 30 | air | 250 | 750 | 30 | 30 |
| Example 10 | 30 | 30 | air | 50 | 750 | 30 | 10 |
| Example 11 | 30 | 30 | air | 50 | 750 | 30 | 150 |
| Example 12 | 30 | 30 | air | 150 | 750 | 30 | 30 |
| Example 13 | 30 | 30 | air | 50 | 780 | 30 | 30 |
| Comparative Example 1 | 30 | 100 | air | 50 | 750 | 30 | 30 |
| Comparative Example 2 | 30 | 30 | under reduced pressure of $10^{-4}$ MPa *3 | 50 | 750 | 30 | 30 |
| Comparative Example 3 | 30 | 30 | air | 50 | 800 | 30 | 30 |
| Comparative Example 4 | 30 | 30 | air | 50 | 600 | 30 | 30 |
| Comparative Example 5 | 0 | 30 | air | 50 | 750 | 30 | 30 |

| | Composition of thermal energy storage material structure | | | Evaluation |
|---|---|---|---|---|
| | Chemical thermal energy storage material [% by mass] | Generation amount of merwinite [% by mass] | Carbon concentration [% by mass] | Damage deformation during hydration |
| Example 1 | 98 | 2 | 0.1 | C |
| Example 2 | 80 | 20 | 0.2 | B |
| Example 3 | 40 | 60 | 0.3 | A |
| Example 4 | 20 | 80 | 0.4 | A |
| Example 5 | 50 | 50 | 0.5 | B |
| Example 6 | 50 | 50 | 0.5 | B |
| Example 7 | 40 | 60 | 0.3 | C |
| Example 8 | 30 | 30 | 2.0 | C |
| Example 9 | 40 | 60 | 0.3 | A |
| Example 10 | 40 | 60 | 2.0 | C |
| Example 11 | 40 | 60 | 0.3 | A |
| Example 12 | 40 | 60 | 0.3 | A |
| Example 13 | 40 | 60 | 0.3 | C |
| Comparative Example 1 | 70 | 0 | 0.2 | E |
| Comparative Example 2 | 50 | 0 | 2.0 | E |
| Comparative Example 3 | 40 | 60 | 0.3 | D |
| Comparative | 60 | 0 | 1.5 | E |

TABLE 1-continued

| | | | | |
|---|---|---|---|---|
| Example 4 Comparative Example 5 | 100 | 0 | 0.1 | E |

*[1] the ratio of clay mineral to the sum of chemical thermal energy storage material and clay mineral
*[2] the secondary particle size of chemical thermal energy storage material in the mixed powder after mixing
*[3] oxygen concentration = 200 ppm or less As described in the Table 1, in the Examples, the generation of merwinite which is a reaction product of a chemical thermal energy storage material and a clay mineral was confirmed. In the structure, porous structure (mesh-shaped structure) was formed, and the generation of damages such as cracks or deformation accompanied by endotherm and exotherm was prevented. As described in Examples 1 to 4, the higher the content ratio of the clay mineral, the harder the collapse occured.

In cases where the calcination temperature is low or calcination time is short (Examples 5, 6), although some degree of strength was obtained, the strength of the structure decreased as the generation amount of merwinite decreased. On the contrary, even in cases where the calcination time is long (Example 7), the strength of the structure tended to decrease since grain coarsening occured due to sintering. In cases where the rate of temperature increase or the rate of temperature decrease were considerably slow (Example 8, 10), when the rate of temperature increase was too slow, carbonation occured; and when the rate of temperature decrease was too slow, hydration occured and the strength of the structure tended to decrease. In Example 13 where the calcination temperature was elevated to 780° C., collase somewhat tended to occur due to grain coarsening.

Figure 12:
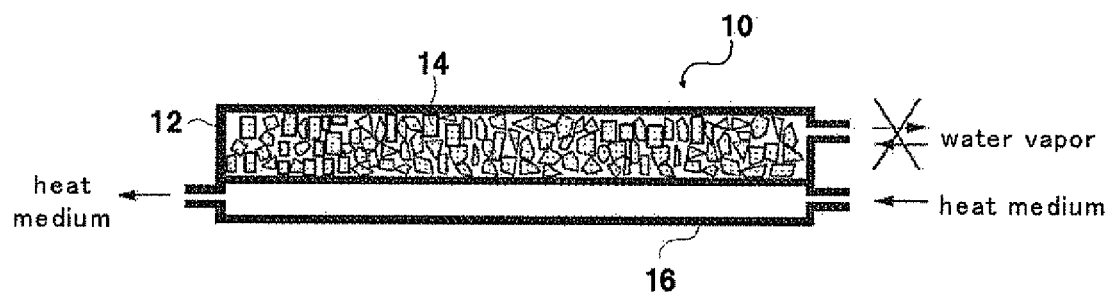
FIG. 12 is a schematic diagram illustrating the state in which the chemical thermal energy storage material is collapsed and fragmented and the gas flow path is blocked.

On the other hand, when the average particle size of the chemical thermal energy storage material is large and coarse as in Comparative Example 1, the reaction with the clay mineral was hard to occur, and metal silicate was not generated, and strength of the structure was insufficient. Like in this case, when the structure collapses, the structure was fragmented as illustrated in FIG. 12. When the gas flow path is provided, the gas flow path was blocked. In Comparative Example 2, when the pressure was reduced and the oxygen concentration in the atmosphere was insufficient, organic substances derived from sepiolite did not completely combusted, and on the surface of sepiolite, carbon resided. As the result of inhibition of the generation of merwinite, the strength of the structure decreased. In cases where the calcination temperature was high (Comparative Example 3), sintering occured and grain coarsening occured, and the strength of the structure decreased. On the contrary, in case where the calcination temperature was low (Comparative Example 4), CaO did not react with sepiolite, and merwinite (metal silicate) was not generated. Also in case where sepiolite was not used (Comparative Example 5), merwinite was not generated, and thus, a desired high strength was not obtained.

Example 14, Comparative Examples 6 to 10

The chemical thermal energy storage material structures manufactured in Example 1 and Comparative Example 5 were used and arranged as a chemical thermal energy storage material 14 of a reactor 41 of a chemical heat accumulator 40 as illustrated in FIG. 7. In gas flow path 42, a chemical thermal energy storage material structure as illustrated in FIG. 8, that is, a gas flow path retaining structure configured by compiling pore network 44 and corrugated plate 46 having a sine curve shaped cross section in the mentioned order was arranged.

Properties of the gas flow path retaining structure were as follows.

[Chemical Thermal Energy Storage Material Structure of Example 1]
Expansion force: 4 MPa
Mean particle size of the granulated powder: 100 μm

[Chemical Thermal Energy Storage Material Structure in Comparative Example 5]
Expansion force: 6 MPa
Mean particle size of granulated powder: 100 μm —Evaluation—

For each of the chemical heat accumulators provided with gas flow path retaining structure, the evaluation below was performed. The evaluation results were described in the Table 2 below.

(2. Flow Path Secure Properties)

The chemical thermal energy storage material structure in the chemical thermal energy storage material structure was heated to 100° C. and saturated water vapor of 50° C. was made in contact therewith to be hydrated. At this time, the state of the gas flow path when the cracks and deformations of the structure occured was observed by visual inspection and the evaluation was performed according to the evaluation criteria below.

<Evaluation Criteria>
A: little amount of granular or powdery thermal energy storage material generated due to cracks and deformation during hydration, no effect on the gas flow path.
B: granular or powdery thermal energy storage material generated due to crack and deformation during hydration entered the gas flow path but the gas flow path was not blocked.
C: a large amount of granular or powdery thermal energy storage material generated due to crack and deformation during hydration, and the flow path could not be secured.

(3. Exotherm Properties)

The temperature of heat medium which was flowed in the heat exchanger of the chemical heat accumulator and the temperature of the heat medium which was flowed out from the pipe after exchanging heat with the chemical thermal energy storage material were measured. The exotherm properties were evaluated according to the evaluation criteria below using the temperature difference therebetween as an indicator.

<Evaluation Criteria>
A: increase in temperature of the heat medium was high (30° C. or higher), favorable exotherm properties were exhibited.
B: increase in temperature of the heat medium was relatively high (10° C. or higher and lower than 30° C.), practically acceptable exotherm properties were exhibited.
C: increase in temperature of the heat medium was low (lower than 10° C.), poor exotherm properties.

TABLE 2

| | | properties of gas flow path retaining structure | | | | evaluation | |
|---|---|---|---|---|---|---|---|
| chemical thermal energy storage material structure | Types of gas flow path retaining structure | compressive strength [MPa] | filtration accuracy [μm] | pressure loss [KPa] | heat capacity [%] | flow path secure | exotherm properties |
| Example 14 | Example 1 | pore network, corrugated plate | 7 | 80 | 5 | 5 | A | A |
| Comparative Example 6 | Comparative Example 5 | pore network, corrugated plate | 7 | 80 | 5 | 5 | B | B |
| Comparative Example 7 | | pore network, porous metal | 5 | 80 | 5 | 8 | C | C |
| Comparative Example 8 | | pore network, corrugated plate | 7 | 150 | 5 | 5 | C | C |
| Comparative Example 9 | | pore network, corrugated plate | 10 | 80 | 12 | 8 | B | C |
| Comparative Example 10 | | pore network, porous metal | 10 | 80 | 8 | 20 | B | C |

As described in Table 2, in Example 14, a gas flow path was secured and favorable exotherm properties were exhibited.

On the other hand, in Comparative Example 6 in which the chemical thermal energy storage material structure in Comparative Example 5 was used, as described in the above-mentioned Table 1, although damages or deformation during hydration tended to occur, by providing a gas flow path retaining structure, a gas flow path was secured and a relatively favorable exotherm properties were exhibited. In Comparative Example 7 in which, although a gas flow path retaining structure was provided, the compressive strength was smaller than the expansion force of the thermal energy storage material, the gas flow path retaining structure was deformed by the hydration expansion of the thermal energy storage material, and the gas flow path could not be secured. Likewise, in Comparative Example 8 in which the filtration accuracy was larger than the mean particle size of the thermal energy storage material granulated powder, the inside of the gas flow path retaining structure was blocked by collapsed thermal energy storage material powder. In Comparative Example 9 in which a gas flow path retaining structure having pressure loss of higher than 10 KPa was used, although a flow path was secured, the amount of water vapor which reached the thermal energy storage material decreased and the exotherm properties considerably deteriorated. In Comparative Example 10 in which a gas flow path retaining structure having the heat capacity with respect to the whole reactor of higher than 10% was used, although a gas flow path was secured, a part of exotherm amount due to hydration was consumed by increasing the temperature of the gas flow path retaining structure, and as the result, the exotherm properties considerably deteriorated.

The entire disclosure of Japanese Patent Application No. 2010-069986 is incorporated herein into this specification by reference.

All documents, patent applications and technical specifications recited in this specification are incorporated herein by reference in this specification to the same extent as if each individual publication, patent applications and technical standard was specifically and individually indicated to be incorporated by reference.

The invention claimed is:

1. A chemical thermal energy storage material structure comprising:
    a granular chemical thermal energy storage material;
    a clay mineral having a layered ribbon structure; and
    a complex metal silicate which is a reaction product of the chemical thermal energy storage material and the clay mineral, and contains at least one alkaline earth metal.

2. The chemical thermal energy storage material structure according to claim 1, wherein the chemical thermal energy storage material has a secondary particle size of 50 μm or less.

3. The chemical thermal energy storage material structure according to claim 1, wherein the structure has a porous structure, and the chemical thermal energy storage material is dispersed and held in the clay mineral by the complex metal silicate.

4. The chemical thermal energy storage material structure according to claim 1, wherein the carbon concentration is 1% by mass or less of the total mass.

5. The chemical thermal energy storage material structure according to claim 1, wherein the content ratio of the complex metal silicate is in a range of 2 to 80% by mass of the total mass.

6. The chemical thermal energy storage material structure according to claim 1, wherein the content ratio of the chemical thermal energy storage material is 20 to 98% by mass of the total mass.

7. The chemical thermal energy storage material structure according to claim 1, wherein the clay mineral is at least one selected from the group consisting of sepiolite, palygorskite and kaolinite.

8. The chemical thermal energy storage material structure according to claim 1, wherein the chemical thermal energy storage material is a hydration reactive thermal energy storage material which absorbs heat by a dehydration reaction and releases heat by a hydration reaction.

9. A method of producing the chemical thermal energy storage material structure according to claim 1, the method comprising:
    mixing at least a powdered chemical thermal energy storage material and a clay mineral having a layered ribbon structure to prepare a mixture in which a secondary particle size of the chemical thermal energy storage material is 50 μm or less;
    molding the mixture to form a molded body; and
    calcinating the molded body in an atmosphere containing oxygen in a temperature range of from 700° C. to lower than 800° C.

10. The method according to claim 9, wherein the calcinating comprises calcinating by heating at a rate of temperature increase of 40° C./min or higher.

11. The method according to claim 9, wherein the calcinating comprises cooling the calcinated molded body at a rate of temperature decrease of 20° C./min. or higher.

12. The method according to claim 11, wherein in the calcinating, at least one of the rate of temperature increase during the calcinating or the rate of temperature decrease of the molded body after the calcination is 150° C./min. or higher.

13. The method according to claim 9, wherein the mixing comprises preparing the mixture by mixing a thermal energy storage material suspension in which the chemical thermal energy storage material is dispersed and suspended in a medium and a clay mineral suspension in which the clay mineral is dispersed and suspended in a medium, drying, and powdering.

14. The method according to claim 13, wherein the content ratio of the clay mineral in the clay mineral suspension is 1 to 10% by mass of the total mass of the suspension.

15. The method according to claim 13, the method further comprising preparing the clay mineral suspension by leaving a dispersion liquid, which is obtained by dispersing the clay mineral in a medium, to stand still.

16. The method according to claim 9, wherein the calcinating comprises performing calcination for 15 to 45 minutes.

17. A chemical heat accumulator comprising: the chemical thermal energy storage material structure according to claim 1; and a gas flow path provided such that a reactant gas circulates and the circulating reactant gas is in contact with the chemical thermal energy storage material structure.

18. The chemical heat accumulator according to claim 17, further comprising a reaction chamber which includes a supply and exhaust opening for supplying the reactant gas and discharging a reaction product gas, wherein
the reaction chamber comprises: the chemical thermal energy storage material structure; and a gas flow path retaining structure which is provided on at least one side of the chemical thermal energy storage material structure, and which retains the shape of the chemical thermal energy storage material structure and secures the gas flow path.

19. The chemical heat accumulator according to claim 18, wherein the gas flow path retaining structure has a compressive strength which is larger than an expansion force of the chemical thermal energy storage material structure.

20. The chemical heat accumulator according to claim 18, wherein the gas flow path retaining structure contains a pore through which the reactant gas can pass, and has a filtration accuracy which is finer than the mean particle size of particles in the chemical thermal energy storage material structure.

21. The chemical heat accumulator according to claim 18, wherein pressure loss in the gas flow path retaining structure is 10 kPa or less.

22. The chemical heat accumulator according to claim 18, wherein the heat capacity of the gas flow path retaining structure is 10% or less of the heat capacity of the entire reaction chamber.

23. The chemical heat accumulator according to claim 17, further comprising a heat exchanger which exchanges heat with the chemical thermal energy storage material structure.

* * * * *